US012665146B2

(12) United States Patent
Liu et al.

(10) Patent No.: US 12,665,146 B2
(45) **Date of Patent: *Jun. 23, 2026**

(54) LIGHTING KEYBOARD AND BACKLIGHT MODULE THEREOF

(71) Applicant: DARFON ELECTRONICS CORP., Taoyuan City (TW)

(72) Inventors: Ying-Lan Liu, Taoyuan City (TW); Hsin-Cheng Ho, Taoyuan City (TW); Heng-Yi Huang, Taoyuan City (TW); Chao-Yu Chen, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 507 days.

This patent is subject to a terminal disclaimer.

(21) Appl. No.: 18/221,371

(22) Filed: Jul. 12, 2023

(65) Prior Publication Data

US 2023/0360869 A1 Nov. 9, 2023

Related U.S. Application Data

(63) Continuation-in-part of application No. 18/297,020, filed on Apr. 7, 2023, now Pat. No. 11,881,363,
(Continued)

(30) Foreign Application Priority Data

Apr. 8, 2022 (TW) ................................ 111113486
Mar. 9, 2023 (TW) ................................ 112108658
(Continued)

(51) Int. Cl.
*H01H 13/83* (2006.01)
*H01H 13/705* (2006.01)

(52) U.S. Cl.
CPC .......... *H01H 13/83* (2013.01); *H01H 13/705* (2013.01); *H01H 2219/04* (2013.01); *H01H 2219/056* (2013.01); *H01H 2219/06* (2013.01)

(58) Field of Classification Search
CPC ............. H01H 13/83; H01H 2219/062; H01H 2219/039; H01H 13/023; H01H 2219/06;
(Continued)

(56) References Cited

U.S. PATENT DOCUMENTS 6,743,993 B1 6/2004 Clark
9,040,856 B2 5/2015 Chen
(Continued)

FOREIGN PATENT DOCUMENTS

CN 106783308 A 5/2017
CN 110335775 A 10/2019
(Continued)

OTHER PUBLICATIONS

Huang, the specification, including the claims, and drawings in the U.S. Appl. No. 18/127,667, filed Mar. 29, 2023.
(Continued)

*Primary Examiner* — Ahmed M Saeed
(74) *Attorney, Agent, or Firm* — Winston Hsu

(57) ABSTRACT

A backlight module is configured to illuminate at least one keycap. The backlight module includes a shielding sheet, a lighting board and a protrusion structure. The lighting board includes an illuminant unit and a pair of footprints respectively connecting the illuminant unit. Each of the footprints includes at least one hollow area, and the at least one hollow area overlaps at least a portion of the illuminant unit. The protrusion structure is formed at the shielding sheet. The protrusion structure protrudes towards the light board and at least partially overlaps the pair of footprints, so that the
(Continued)

backlight module diffuses light of the illuminant between the protrusion structure and the footprints.

17 Claims, 19 Drawing Sheets

Related U.S. Application Data which is a continuation-in-part of application No. 18/127,667, filed on Mar. 29, 2023, now abandoned.

(60) Provisional application No. 63/438,254, filed on Jan. 11, 2023, provisional application No. 63/430,675, filed on Dec. 7, 2022, provisional application No. 63/378,261, filed on Oct. 4, 2022, provisional application No. 63/408,069, filed on Sep. 19, 2022, provisional application No. 63/408,062, filed on Sep. 19, 2022, provisional application No. 63/368,272, filed on Jul. 13, 2022, provisional application No. 63/325,623, filed on Mar. 31, 2022.

(30) Foreign Application Priority Data

| | | |
|---|---|---|
| Mar. 20, 2023 | (TW) | 112110265 |
| Mar. 28, 2023 | (TW) | 112111749 |
| May 5, 2023 | (TW) | 112116725 |

(58) Field of Classification Search
CPC ............... H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS

| | | | | |
|---|---|---|---|---|
| 9,214,301 | B2 | 12/2015 | Chen | |
| 9,299,515 | B2 | 3/2016 | Chen | |
| 10,276,327 | B2 | 4/2019 | Chen | |
| 10,586,664 | B2 | 3/2020 | Yeh | |
| 11,036,306 | B2 | 6/2021 | Cheng | |
| 11,170,950 | B2 | 11/2021 | Liang | |
| 11,257,638 | B2 | 2/2022 | Liang | |
| 11,371,676 | B2 | 6/2022 | Huang | |
| 11,409,373 | B2 | 8/2022 | Cheng | |
| 11,443,907 | B2 | 9/2022 | Ho | |
| 11,515,107 | B2 | 11/2022 | Chen | |
| 11,538,641 | B2 | 12/2022 | Liang | |
| 11,550,094 | B1 * | 1/2023 | Ho | G02B 6/0088 |
| 11,574,778 | B2 * | 2/2023 | Huang | H01H 13/14 |
| 12,046,428 | B2 * | 7/2024 | Chen | G02B 6/0088 |
| 12,253,706 | B2 * | 3/2025 | Wu | G02B 6/0055 |
| 2011/0037730 | A1 | 2/2011 | Wang | |
| 2015/0212254 | A1 | 7/2015 | Sun | |
| 2017/0352504 | A1 | 12/2017 | Chen | |
| 2019/0027326 | A1 | 1/2019 | Tsai | |
| 2019/0369744 | A1 | 12/2019 | Wu | |
| 2020/0043681 | A1 | 2/2020 | Chen | |
| 2020/0402748 | A1 | 12/2020 | Cheng | |
| 2022/0293356 | A1 * | 9/2022 | Wu | G02B 6/0021 |
| 2022/0406977 | A1 | 12/2022 | Ho | |
| 2023/0326692 | A1 * | 10/2023 | Ho | H01H 13/83 200/314 |
| 2023/0341606 | A1 * | 10/2023 | Ho | G02B 6/0058 |
| 2023/0343525 | A1 * | 10/2023 | Liu | H01H 13/023 |
| 2023/0358944 | A1 * | 11/2023 | Liu | G02B 6/0021 |
| 2023/0360869 | A1 * | 11/2023 | Liu | G02B 6/0083 |
| 2023/0420199 | A1 * | 12/2023 | Liu | G02B 6/0021 |
| 2024/0096568 | A1 * | 3/2024 | Huang | H01H 13/83 |
| 2024/0361509 | A1 * | 10/2024 | Wu | G02B 6/0055 |
| 2026/0018350 | A1 * | 1/2026 | Pan | H01H 13/023 |

FOREIGN PATENT DOCUMENTS

| | | | |
|---|---|---|---|
| CN | 110880456 | A | 3/2020 |
| CN | 113632249 | A | 11/2021 |
| JP | 2019-139728 | | 8/2019 |
| TW | M334393 | | 6/2008 |
| TW | M395202 | U1 | 12/2010 |
| TW | I527075 | B | 3/2016 |
| TW | I604484 | B | 11/2017 |
| TW | 201824318 | A | 7/2018 |
| TW | I632577 | B | 8/2018 |
| TW | I725894 | | 4/2021 |
| TW | I760181 | B | 4/2022 |

OTHER PUBLICATIONS

Liu, the specification, including the claims, and drawings in the U.S. Appl. No. 18/128,235, filed Mar. 30, 2023.
Chen, the specification, including the claims, and drawings in the U.S. Appl. No. 18/128,261, filed Mar. 30, 2023.
Huang, the specification, including the claims, and drawings in the U.S. Appl. No. 18/330,342, filed Jun. 6, 2023.

* cited by examiner

LIGHTING KEYBOARD AND BACKLIGHT MODULE THEREOF

CROSS REFERENCE TO RELATED APPLICATIONS

This application claims the benefit of U.S. Provisional Application No. 63/408,062, filed on Sep. 19, 2022. Further, this application claims the benefit of U.S. Provisional Application No. 63/408,069, filed on Sep. 19, 2022. Further, this application is a continuation-in-part of U.S. application Ser. No. 18/297,020, filed on Apr. 7, 2023, which claims the benefit of U.S. Provisional Application No. 63/430,675, filed on Dec. 7, 2022, and claims the benefit of U.S. Provisional Application No. 63/438,254, filed on Jan. 11, 2023, and claims the benefit of U.S. Provisional Application No. 63/368,272, filed on Jul. 13, 2022, and is a continuation-in-part of U.S. application Ser. No. 18/127,667, filed on Mar. 29, 2023, which claims the benefit of U.S. Provisional Application No. 63/325,623, filed on Mar. 31, 2022, and claims the benefit of U.S. Provisional Application No. 63/430,675, filed on Dec. 7, 2022, and claims the benefit of U.S. Provisional Application No. 63/378,261, filed on Oct. 4, 2022. The contents of these applications are incorporated herein by reference.

BACKGROUND OF THE INVENTION

1. Field of the Invention

The invention relates to a lighting keyboard and a backlight module and, more particularly, to a lighting keyboard and a backlight module capable of enhancing the overall illuminating consistency.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

The invention provides a lighting keyboard, a backlight module and a lighting board capable of enhancing the overall illuminating consistency, so as to solve the aforesaid problems.

According to an embodiment, the invention provides a backlight module configured to illuminate at least one keycap. The backlight module comprises a shielding sheet, a lighting board and a protrusion structure. The lighting board comprises an illuminant unit and a pair of footprints respectively connecting the illuminant unit. Each of the footprints comprises at least one hollow area. The at least one hollow area overlaps with at least a portion of the illuminant unit. The protrusion structure is formed at the shielding sheet. The protrusion structure protrudes towards the lighting board and at least partially overlaps with the pair of footprints. In an embodiment, the lighting board further comprises a first reflective layer surrounding the illuminant unit and at least partially covering the at least one hollow area. In an embodiment, the lighting board further comprises a pair of micro-structure regions apart from each other and located at opposite sides of the protrusion structure. In an embodiment, each of the footprints comprises a plurality of branches defining the at least one hollow area. In an embodiment, at least one of the plurality of branches of the pair of footprints comprises an exposed section capable of reflecting light. In an embodiment, the plurality of branches of the pair of footprints form a pair of flat sides parallel to each other, and a short side of the illuminant unit is smaller than a width of the pair of flat sides. In an embodiment, the backlight module further comprises a light guide panel having a light guide hole for accommodating the illuminant unit, and the lighting board comprises a first reflective layer at least partially located in the light guide hole. In an embodiment, the first reflective layer has a reflective layer hole, and a part of the first reflective layer overlapping with the pair of footprints is at least partially located between the reflective layer hole and the light guide hole. In an embodiment, the lighting board comprises a first reflective layer, and the shielding sheet comprises an inner reflective area overlapping with the protrusion structure and the first reflective layer. In an embodiment, the backlight module further comprises an adhesive layer at least partially surrounding the protrusion structure in a vertical direction. In an embodiment, the illuminant unit comprises at least three dies providing at least three color lights, and the at least three dies are arranged consecutively with short side to short side. In an embodiment, the lighting board comprises two main traces apart from each other and electrically connected to the pair of footprints, and the protrusion structure is located between the two main traces. In an embodiment, the lighting board further comprises a pair of inner micro-structure regions apart from each other and located between the two main traces. In an embodiment, the lighting board further comprises a pair of outer micro-structure regions apart from each other and located beyond the two main traces. In an embodiment, the lighting board comprises two sub-traces electrically connected to the pair of footprints, and the lighting board further comprises a pair of inner micro-structure regions apart from each other and located at opposite sides of the two sub-traces.

According to another embodiment, the invention provides a lighting keyboard comprising a plurality of keycaps. The lighting keyboard further comprises the backlight module of the aforesaid embodiments. The backlight module is disposed below the plurality of keycaps.

According to another embodiment, the invention provides a backlight module comprising a shielding sheet, an illuminant unit and a lighting board, wherein the backlight module comprises a first uniform light area surrounding the illuminant unit to make light of the illuminant unit uniform. The first uniform light area comprises a protrusion structure, a pair of footprints and a first reflective layer. The protrusion structure is formed at the shielding sheet and protrudes towards the lighting board. The protrusion structure diffuses the light of the illuminant unit. The pair of footprints are located on the lighting board and configured to connect the illuminant unit. The first reflective layer is located on the lighting board and comprises an inner ring section at least partially covering the pair of footprints. The inner ring section of the first reflective layer reflects light from the illuminant unit and/or the protrusion structure. In an embodiment, the backlight module further comprises a second uniform light area surrounding the first uniform light area, the second uniform light area comprises a pair of micro-structure regions apart from each other and located on the first reflective layer, and the pair of micro-structure regions are located at opposite sides of the protrusion structure. In an embodiment, the backlight module further comprises a light guide panel located between the shielding sheet and the lighting board, and the protrusion structure diffuses the light of the illuminant unit to be transmitted laterally in the light guide panel. In an embodiment, the backlight module further comprises a light guide panel having a light guide hole for accommodating the illuminant unit, and the first reflective layer is at least partially located in the light guide hole.

As mentioned in the above, the invention forms a protruding structure between the two non-intersecting traces or the plurality of micro-structure regions, and the position of the protruding structure corresponds to the position of the illuminant unit. Accordingly, the amount of light emitted by the illuminant unit entering the light guide panel can be increased and the micro-structure regions specifically arranged on the lighting board can be used to recycle light or assist light output, so as to enhance the overall illuminating consistency.

Furthermore, the embodiments of the invention simultaneously solve the problem of connection stability of the illuminant unit and the problem of excessive concentration of light emitted from adjacent areas of the illuminant unit. In addition to using the footprints with the hollow areas to ensure that the illuminant unit can still be connected well when the illuminant unit is offset during mounting process, the footprints and the hollow areas thereof are further used together with the first reflective layer to form a light uniform design in the first uniform light area. Furthermore, combined with the inner micro-structure regions of the lighting board in the second uniform light area and the adhesive layer and the non-adhesive area in the third uniform light area, the invention provides different light uniform schemes for different blocks along the outward optical path of the illuminant unit, such that a high degree of uniformity can be achieved in a single key and the entire keyboard.

These and other objectives of the present invention will no doubt become obvious to those of ordinary skill in the art after reading the following detailed description of the preferred embodiment that is illustrated in the various figures and drawings.

DETAILED DESCRIPTION

A low power illuminant unit, such as mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the invention first focus on how to make a large proportion of light from the illuminant unit enter a light guide panel for lateral transmission, and how to effectively recycle the light that passes through the light guide panel during the lateral transmission into the light guide panel for reuse.

Figure 1:
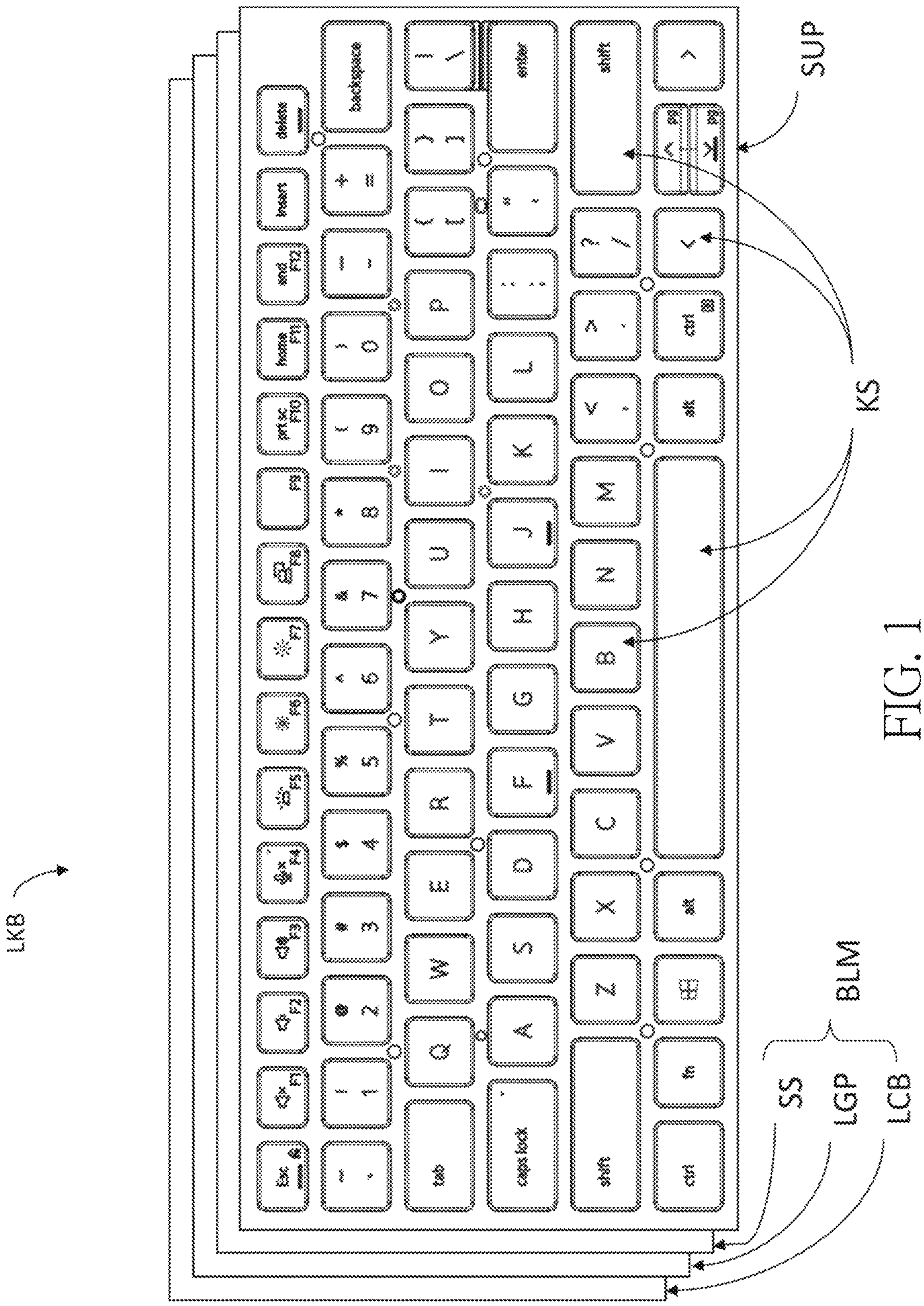
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

As shown in FIG. 1, the lighting keyboard LKB comprises a backlight module BLM and a plurality of keyswitches KS. A support plate SUP is disposed on the backlight module BLM and the keyswitches KS are disposed on the support plate SUP. In general, the keyswitches KS may comprise square keys and multiple keys (e.g. space key). It should be noted that the number, size and arrangement of the keyswitches KS may be determined according to practical applications, so the invention is not limited to the embodiment shown in the figure.

The backlight module BLM comprises a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one illuminant unit (e.g. LED) on the lighting board LCB of the backlight module BLM.

Figure 2:
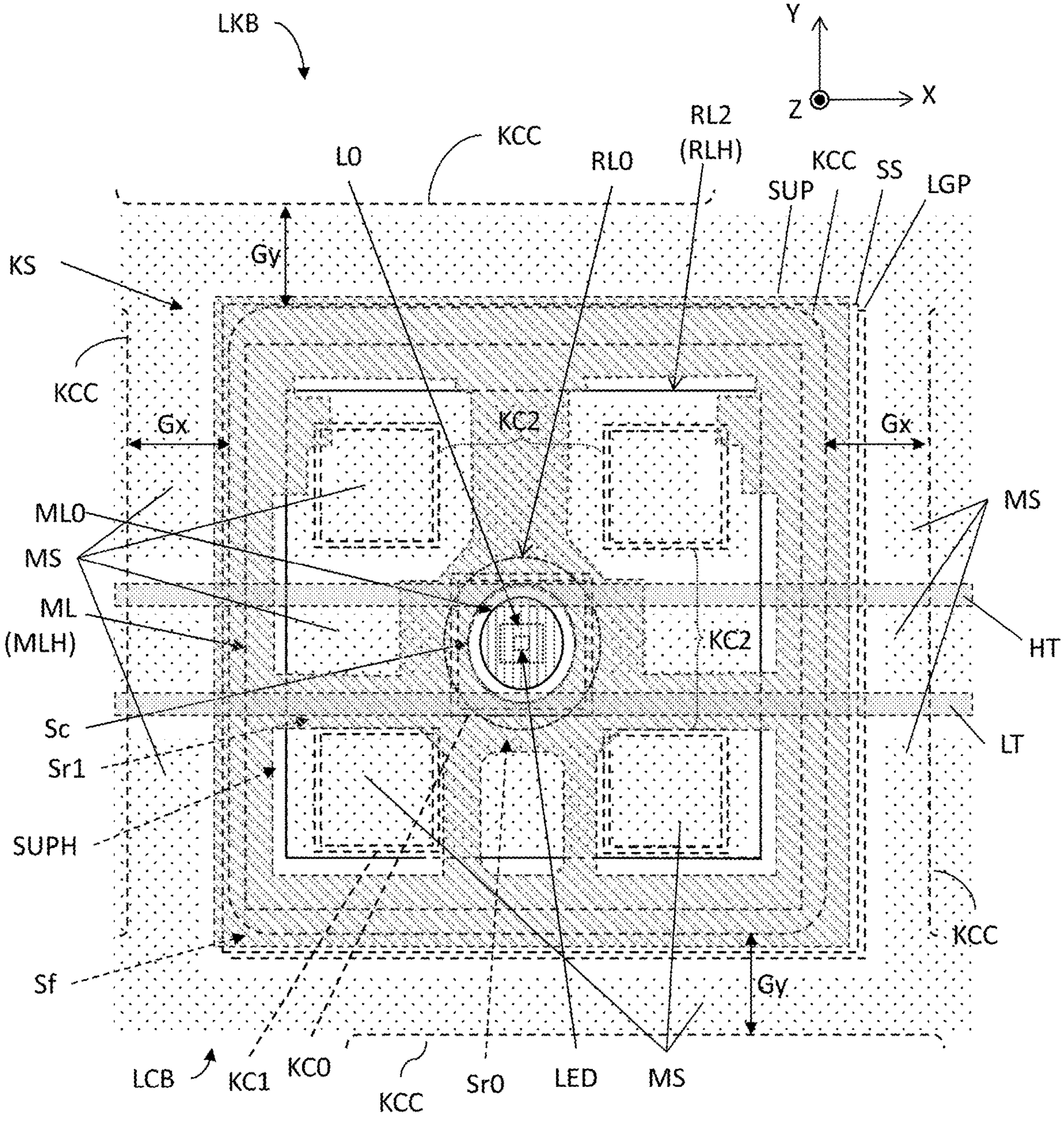
FIG. 2 is a partial top view illustrating the lighting keyboard shown in FIG. 1.
Figure 3:
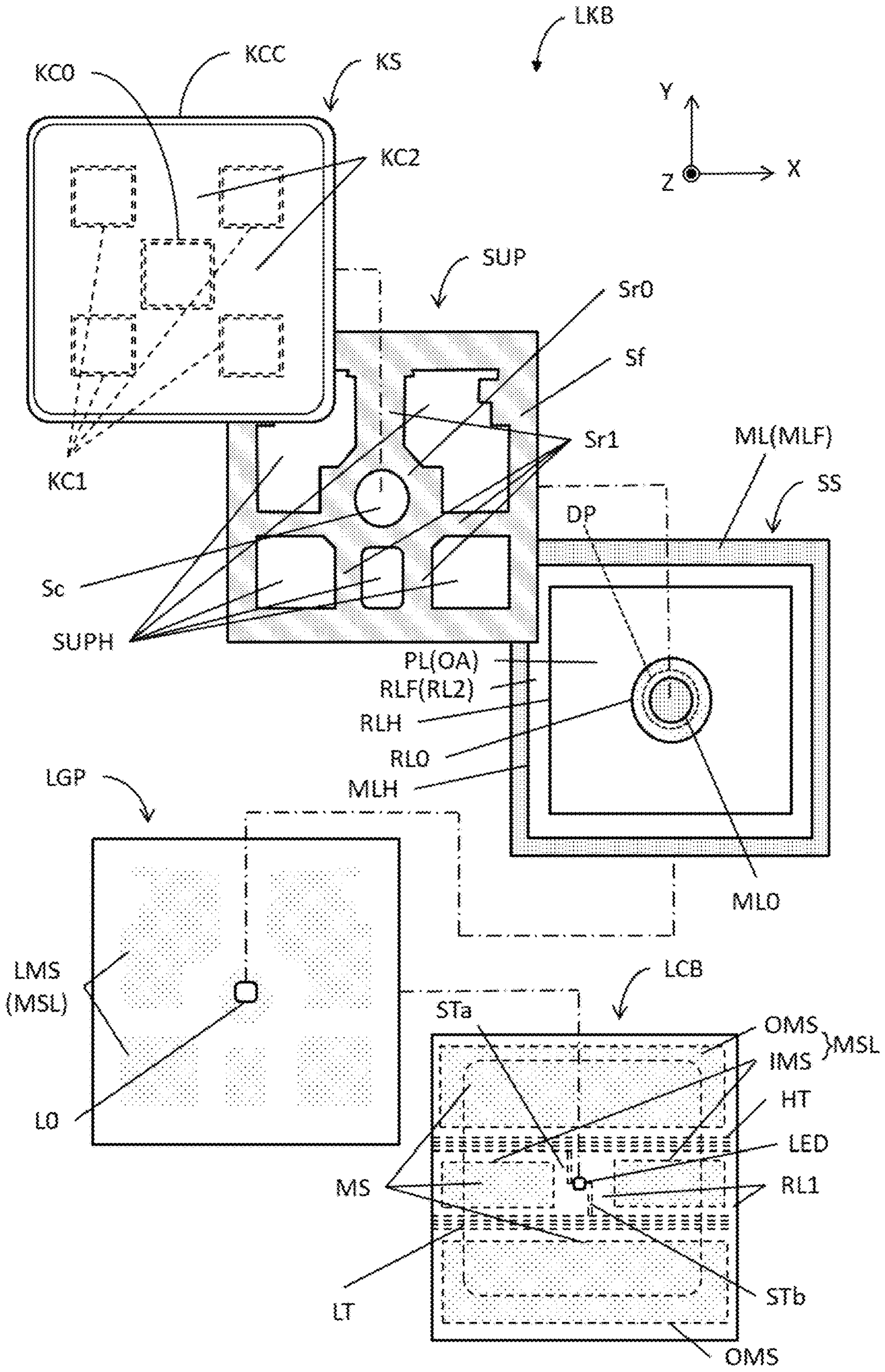
FIG. 3 is a partial exploded view illustrating the lighting keyboard shown in FIG. 1.
Figure 4:
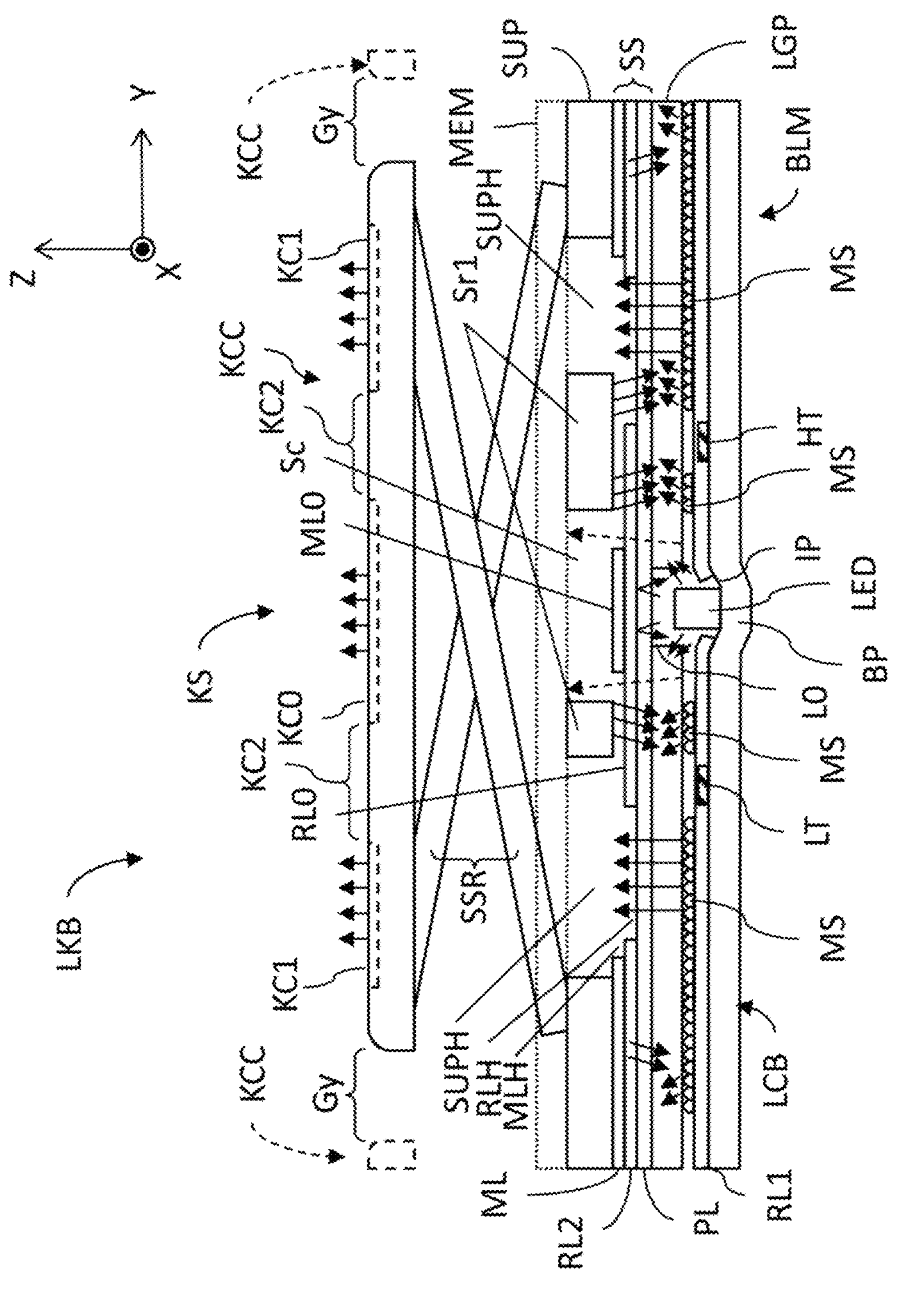
FIG. 4 is a partial sectional view illustrating the lighting keyboard shown in FIG. 1.

Referring to FIGS. 2 to 4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2 to 4, the lighting board LCB comprises two non-intersecting traces LT, HT, another two non-intersecting traces STa, STb, a illuminant unit LED, a first reflective layer RL1 and a plurality of micro-structure regions MS. The lighting board LCB may be a lighting circuit board. The illuminant unit LED is connected between the two non-intersecting traces STa, STb, and the illuminant unit LED is connected between the two non-intersecting traces LT, HT through the two non-intersecting traces STa, STb. In this embodiment, the traces LT, HT are main traces of the illuminant unit LED and the traces STa, STb are sub-traces of the illuminant unit LED, wherein the trace LT may be a low-voltage trace and the trace HT may be a high-voltage trace. The illuminant unit LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a smaller cross-sectional area. Although the traces STa, STb may be located at the same line, the ends of the traces STa, STb are respectively connected to two electrodes of the illuminant unit LED. Thus, the traces STa, STb do not overlap with each other.

The first reflective layer RL1 is disposed on the two non-intersecting traces LT, HT and the other two non-intersecting traces STa, STb. The micro-structure regions MS are formed on the first reflective layer RL1. In this embodiment, the micro-structure regions MS may be a concave-convex structure formed on the first reflective layer RL1. For example, the lighting board LCB may be composed of a flexible circuit board and a copper mesh (as the component Mh shown in FIG. 14B) may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper wire regions (e.g. traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g. lower than the thickness of the copper foil substrate (including the adjacent tiled copper mesh and copper wire region). Furthermore, the first reflective layer RL1 needs to have a high degree of plasticity, so as to form a concave-convex micro-structure on the copper mesh and copper wire region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective micro-structure and the effect of reflective diffusion.

In addition, even if the traces of the lighting board LCB are not copper foil substrate, there is neither a thicker copper trace nor a copper mesh to strengthen the structural strength of the lighting board LCB, a micro-structure with a diffusion effect may still be formed on the first reflective layer RL1. For example, micro-dot ink may be printed on the first reflective layer RL1 to form concave/convex regions as the micro-structure regions MS; or the ink with larger size reflective particles may be used to spray or print the first reflective layer RL1 to simultaneously form the concave/convex regions as the micro-structure regions MS; or, if the first reflective layer RL1 is a layer of reflective film, as long as the surface of the reflective film has reflective particles with medium or low flatness and has a concave-convex reflective surface, the reflective film may be used as the micro-structure regions MS.

In this embodiment, within a range of a single keyswitch KS, the micro-structure regions MS comprises two inner micro-structure regions IMS and two outer micro-structure regions OMS, wherein the two inner micro-structure regions IMS are located between the two non-intersecting traces LT, HT, and the two outer micro-structure regions OMS are located beyond the two non-intersecting traces LT, HT. The patterns of the two inner micro-structure regions IMS may be different from the patterns of the two outer micro-structure regions OMS, but the invention is not so limited. The illuminant unit LED is located between the micro-structure regions MS, i.e. the illuminant unit LED is located between the two inner micro-structure regions IMS and also located between the two outer micro-structure regions OMS.

In this embodiment, the traces STa, STb separate the two inner micro-structure regions IMS, so the traces STa, STb are also located between the two inner micro-structure regions IMS. Similarly, the traces LT, HT respectively separate one outer micro-structure region OMS and two inner micro-structure regions IMS, so it can also be said that the traces LT, HT are respectively located between one outer micro-structure region OMS and two inner micro-structure regions IMS. In some embodiments, the aforesaid micro-structure regions MS, no matter whether they are the outer micro-structure regions OMS or the inner micro-structure regions IMS, neither overlap with the traces LT, HT, nor overlap with the traces STa, STb. For example, there is the case when the traces of the lighting board LCB are formed by copper wires with copper mesh. If the micro-structure regions MS on the first reflective layer RL1 is only surface-treated and not formed from the underlying copper mesh or other substrates, the micro-structure regions MS/OMS/IMS may overlap with the traces LT, HT, or overlap with the traces STa, STb. The light guide panel LGP has a light guide hole L0 and the illuminant unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. Furthermore, the light guide panel LGP also has a plurality of micro-structure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the micro-structure regions LMS of the light guide panel LGP may at least partially overlap with the micro-structure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner micro-structure regions IMS, which is on the first reflective layer RL1 of the lighting board LCB and close to the illuminant unit LED, may be used as an optical adjustment manner. When the light output near the illuminant unit LED is excessively weakened (e.g. resulted from the area of an inner mask layer ML0 of a mask layer ML of the shielding sheet SS is too large, or the light transmittance of an inner reflective section RL0 of a second reflective layer RL2 is too low), at this time, the inner micro-structure regions IMS, which is on the first reflective layer RL1 of the lighting board LCB and close to the illuminant unit LED, can enhance the illuminating effect of the light passing through the inner hole Sc or the inner outlet KC0 of the keycap KCC.

A preferred manner to optimize the arrangement of the aforesaid micro-structure regions MS/OMS/IMS is to dispose the traces STa, STb, LT, HT as far as possible to overlap with any rib region or frame region (e.g. surrounding rib Sr0, bridge rib Sr1 and support frame Sf) of the support plate SUP. Thus, the aforesaid micro-structure regions MS/OMS/IMS may correspond to the micro-structure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the micro-structure regions MS/OMS/IMS may overlap with the surrounding rib Sr0, the bridge rib Sr1 or the support frame Sf. Although these positions cannot emit light, the micro-structure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid micro-structure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the micro-structure regions MS. The shielding sheet SS comprises a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e. the second reflective layer RL2 may reflect part of the light and allow part of the light to pass through. The mask layer ML may be black ink and the second reflective layer RL2 may be white ink, but the invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the illuminant unit LED. In this embodiment, the inner mask layer ML0 and/or the inner reflective section RL0 above the illuminant unit LED is at least partially projected between the two non-intersecting traces LT, HT or between the two non-intersecting traces STa, STb.

Each of the keyswitches KS comprises a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner micro-structure regions IMS at least partially overlap with projections of the inner hole Sc, the surrounding rib Sr0, the bridge ribs Sr1 and/or the support frame Sf. Still further, the two outer micro-structure regions OMS at least partially overlap with projections of the surrounding rib Sr0, the plurality of bridge ribs Sr1 and/or the support frame Sf.

The keyswitch KS comprises a keycap KCC, a support mechanism SSR, a circuit board MEM and a support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the illuminant unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g. membrane switch or other trigger switches) corresponding to the keyswitch KS.

From top view, the illuminant unit LED, the light guide hole L0, the inner reflective section RL0, the inner mask layer ML0, the inner hole Sc, the inner outlet KC0 and the adhesive around the light guide hole L0 may be located between the two non-intersecting traces LT, HT and/or STa, STb.

From top view, the illuminant unit LED, the light guide hole L0, the inner reflective section RL0, the inner mask layer ML0, the inner hole Sc, the inner outlet KC0 and the adhesive around the light guide hole L0 may be located between the two inner micro-structure regions IMS.

As shown in FIG. 4, the backlight module BLM further comprises a protrusion structure BP, wherein the position of the protrusion structure BP corresponds to the position of the illuminant unit LED, and the protrusion structure BP is located between the two non-intersecting traces LT, HT. Furthermore, the protrusion structure BP is also located between the micro-structure regions MS, i.e. the protrusion structure BP is located between the two inner micro-structure regions IMS and also located between the two outer micro-structure regions OMS. In this embodiment, the protrusion structure BP is formed on the lighting board LCB and the protrusion structure BP forms a notch IP for accommodating the illuminant unit LED, such that an upper surface of the illuminant unit LED is flash with or lower than an upper surface of the light guide panel LGP and higher than a lower surface of the light guide panel LGP. Since the shielding sheet SS is disposed on the light guide panel LGP, the upper surface of the illuminant unit LED is also flash with or lower than a lower surface of the shielding sheet SS, such that the shielding sheet SS can be kept flat and will not be pushed by the illuminant unit LED to partially enter the inner hole Sc of the support plate SUP. Accordingly, the amount of light emitted by the illuminant unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the illuminant unit LED below the shielding sheet SS.

Figure 5:
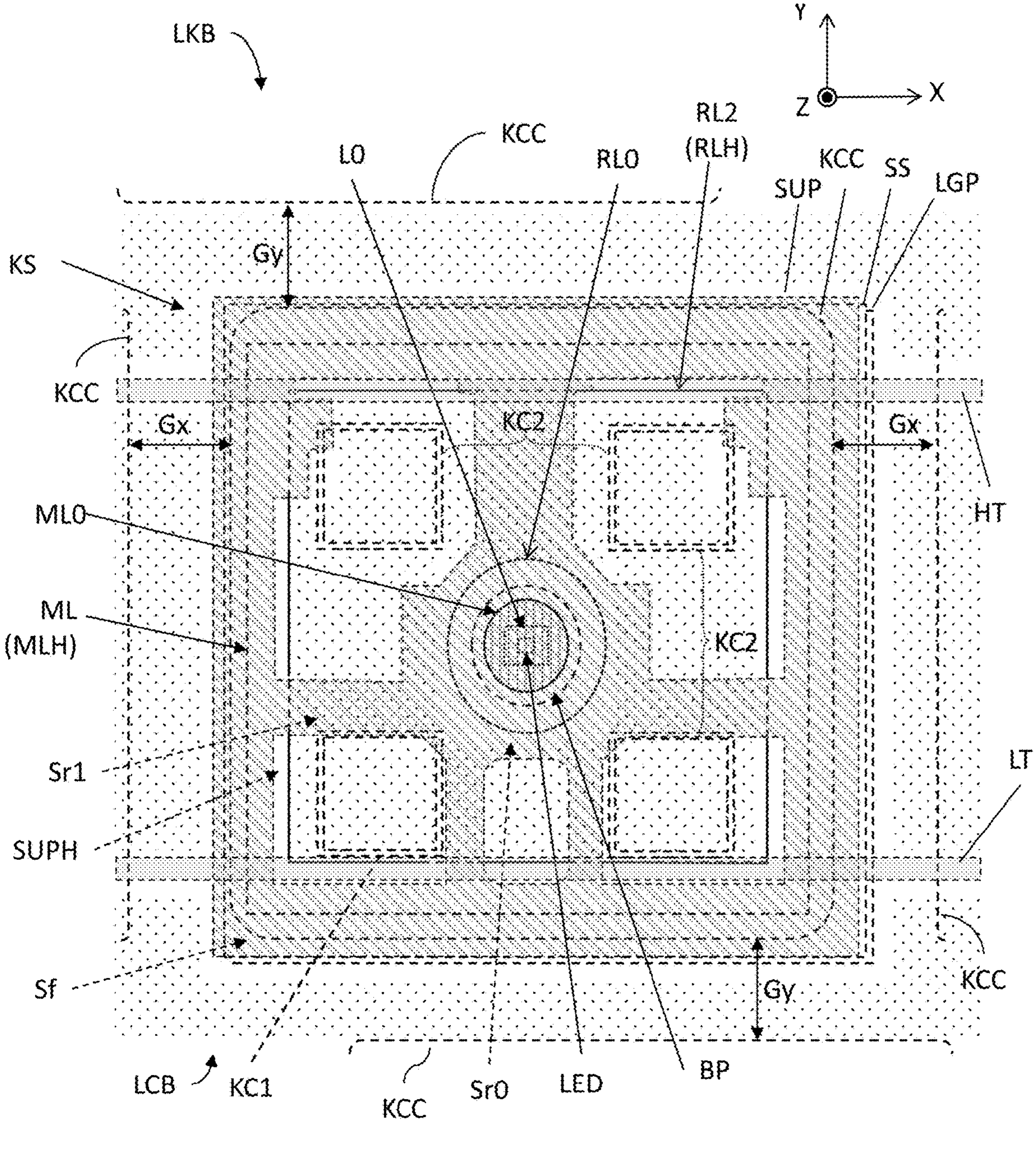
FIG. 5 is a partial top view illustrating the lighting keyboard according to another embodiment of the invention.
Figure 6:
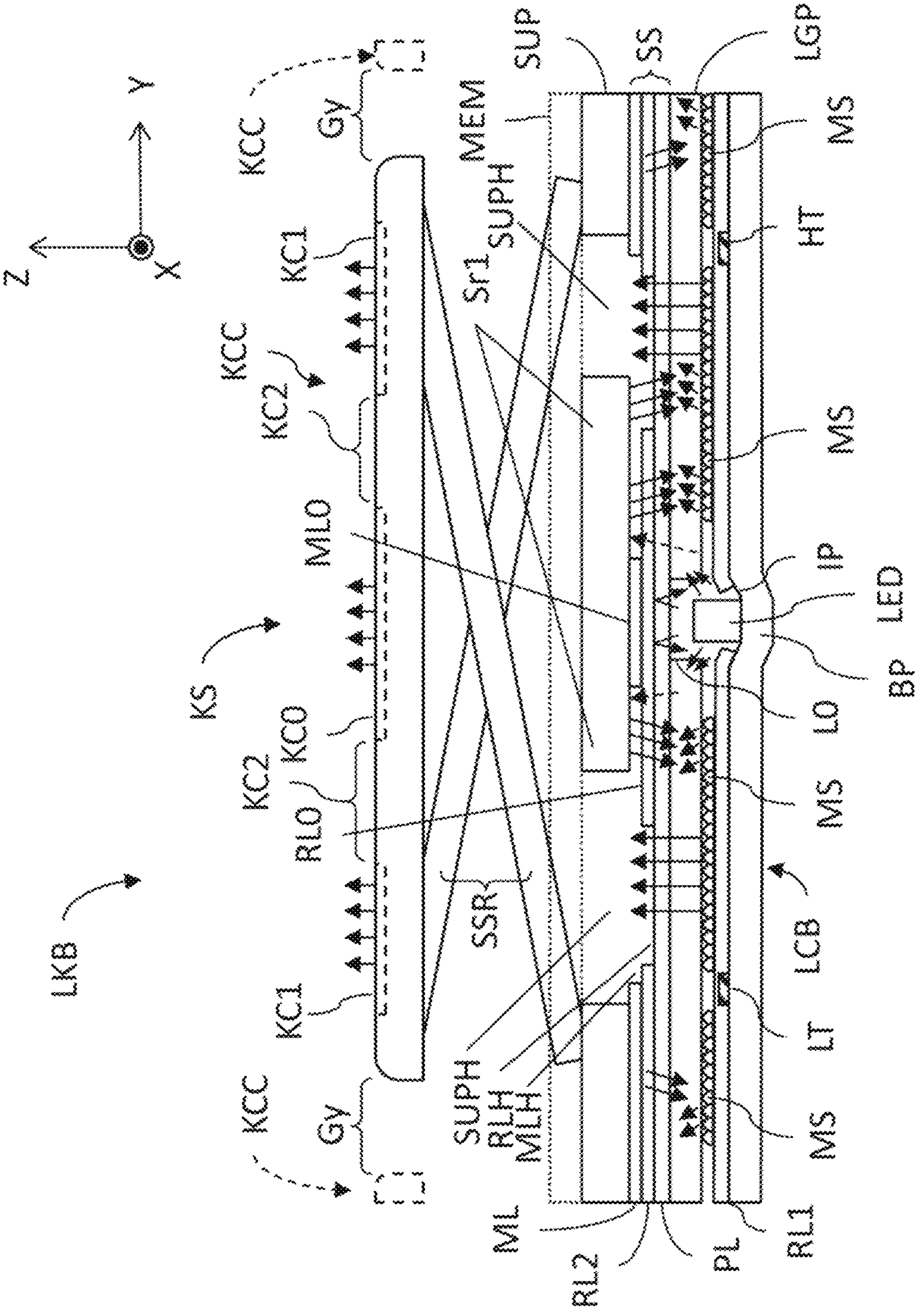
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the illuminant unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
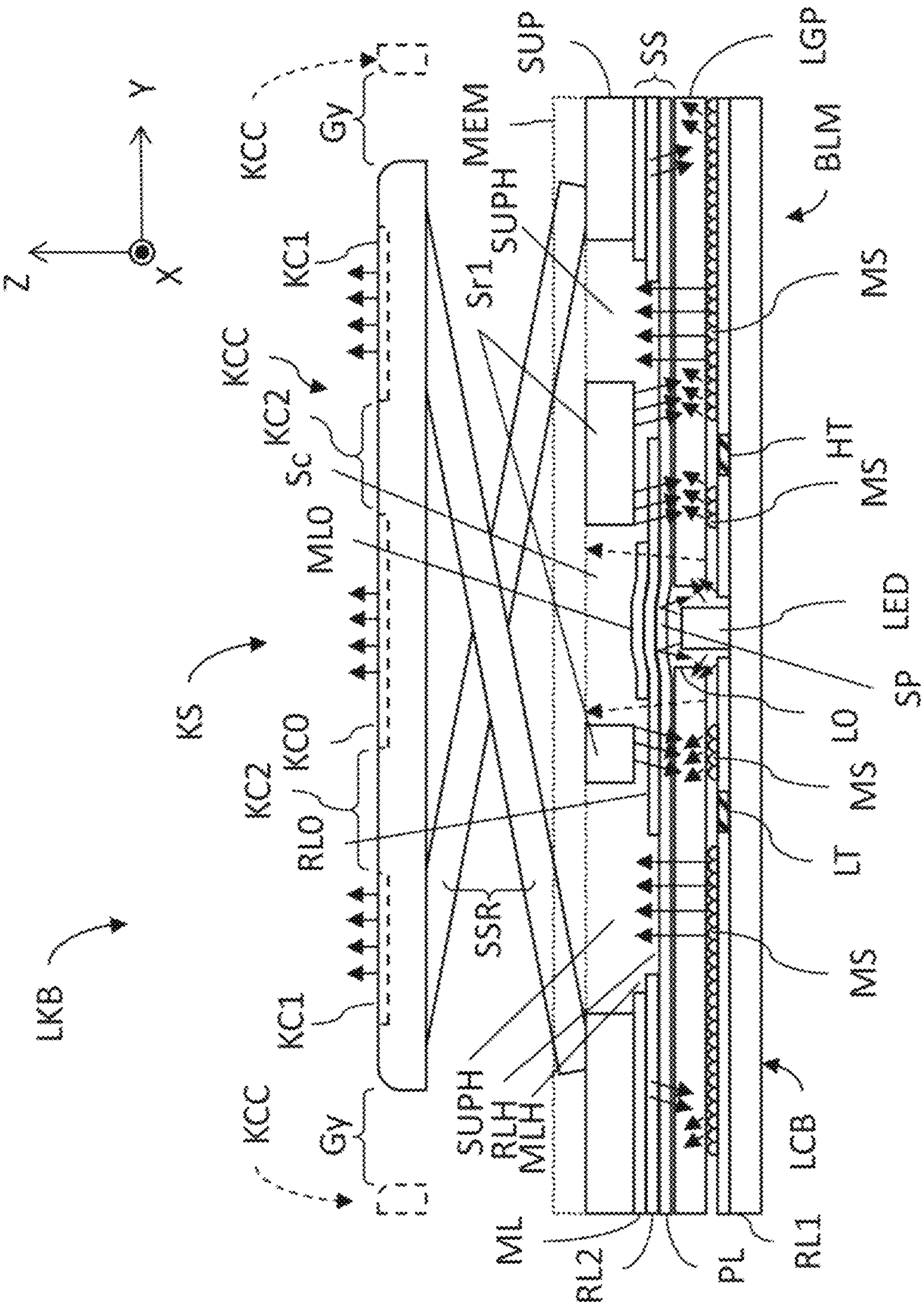
FIG. 7 is a partial sectional view illustrating the lighting keyboard according to another embodiment of the invention.

Referring to FIG. 7, FIG. 7 is a partial sectional view illustrating the lighting keyboard LKB according to another embodiment of the invention.

As shown in FIG. 7, a protrusion structure SP of the backlight module BLM may be formed on the shielding sheet SS, wherein the illuminant unit LED is located below the protrusion structure SP. The position of the protrusion structure SP corresponds to the position of the illuminant unit LED, and the protrusion structure SP is located between the two non-intersecting traces LT, HT. Furthermore, the protrusion structure SP is also located between the micro-structure regions MS, i.e. the protrusion structure SP is located between the two inner micro-structure regions IMS and also located between the two outer micro-structure regions OMS. In this embodiment, the protrusion structure SP may be lower than or slightly enter the inner hole Sc of the support plate SUP, and an upper surface of the illuminant unit LED is flash with or lower than an upper surface of the light guide panel LGP or a lower surface of the shielding sheet SS. In FIG. 7, since the protrusion structure SP is formed on the shielding sheet SS, the second reflective layer RL0 of the shielding sheet SS above the illuminant unit LED forms a curved surface or an inclined surface due to the protrusion structure SP. Because the reflection angle provided by the flat second reflective layer RL0 is small, it is difficult to guide the light emitted upward to directly enter the wall of the light guide hole L0 of the light guide panel LGP.

Figure 8:
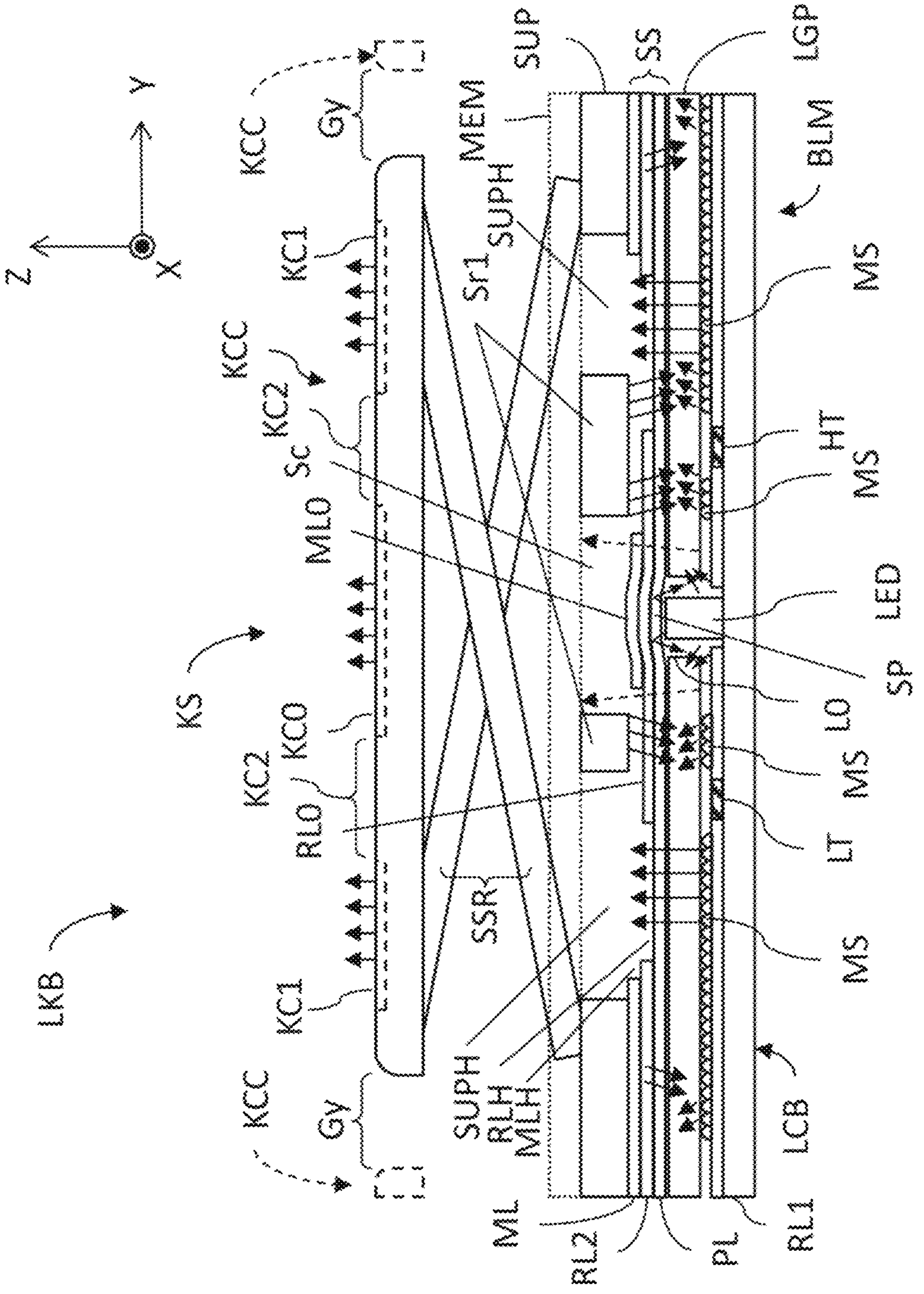
FIG. 8 is a partial sectional view illustrating the lighting keyboard according to another embodiment of the invention.

Referring to FIG. 8, FIG. 8 is a partial sectional view illustrating the lighting keyboard LKB according to another embodiment of the invention.

As shown in FIG. 8, an upper surface of the illuminant unit LED may be higher than an upper surface of the light guide panel LGP and lower than a lower surface of the shielding sheet SS, i.e. the upper surface of the illuminant unit LED may be located between the upper surface of the light guide panel LGP and the lower surface of the shielding sheet SS. In other words, if necessary, the upper surface of the illuminant unit LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the illuminant unit LED. At this time, the upper surface of the illuminant unit LED is located between the lower surface of the support plate SUP and the upper surface of the light guide panel LGP. Accordingly, when the upper surface of the illuminant unit LED is higher than the upper surface of the light guide panel LGP, the protrusion structure SP may provide a space for accommodating the illuminant unit LED, so as to prevent the illuminant unit LED from interfering with the shielding sheet SS.

Figure 9:
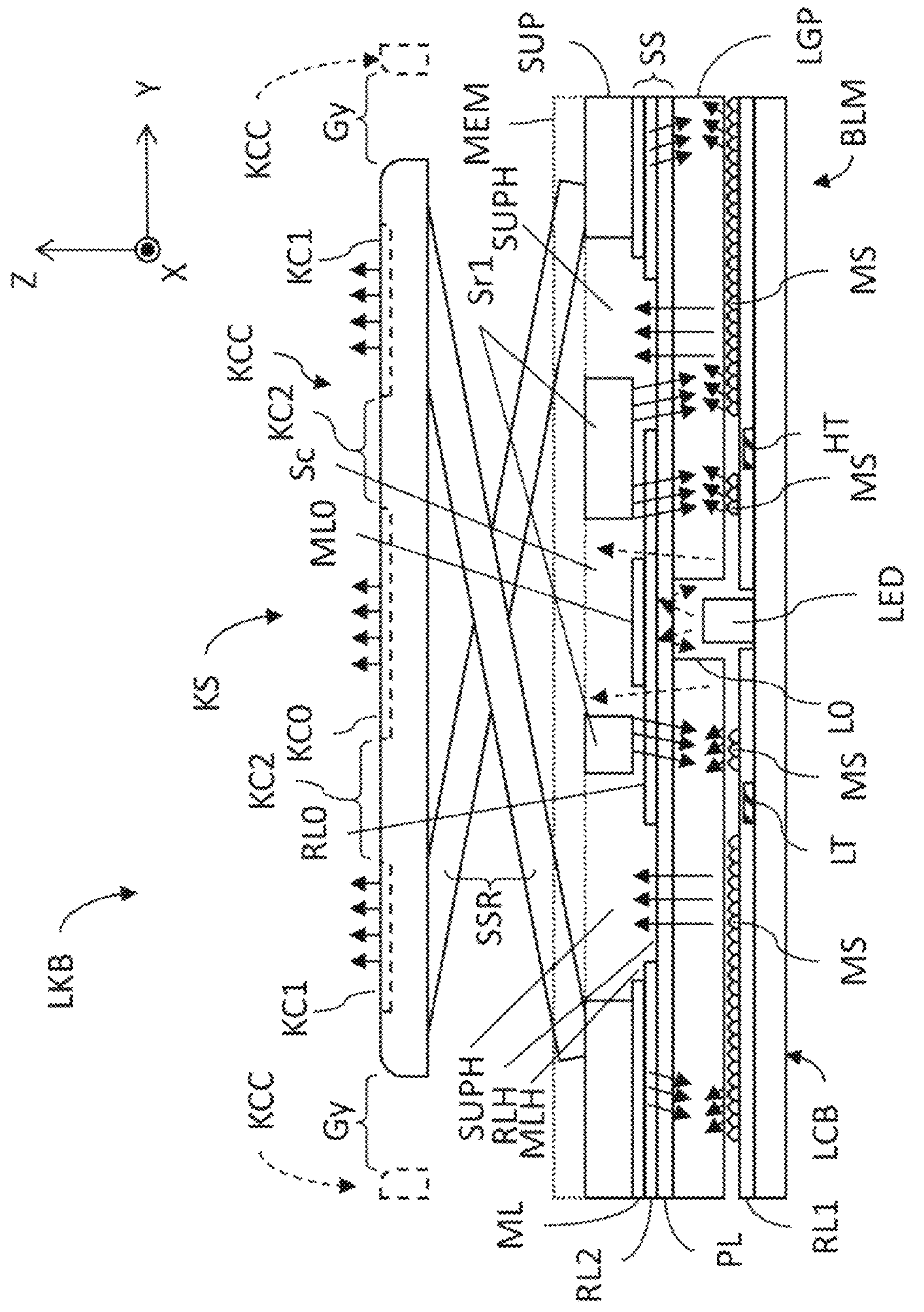
FIG. 9 is a partial sectional view illustrating the lighting keyboard according to another embodiment of the invention.

Referring to FIG. 9, FIG. 9 is a partial sectional view illustrating the lighting keyboard LKB according to another embodiment of the invention.

As shown in FIG. 9, the lighting keyboard LKB may not comprise the protrusion structure BP shown in FIG. 4 or the protrusion structure SP shown in FIG. 7. In this embodiment, an upper surface of the illuminant unit LED is flash with or lower than an upper surface of the light guide panel LGP and higher than a lower surface of the light guide panel LGP. Accordingly, the amount of light emitted by the illuminant unit LED entering the light guide panel LGP can be increased, so as to enhance the overall illuminating consistency.

Figure 10:
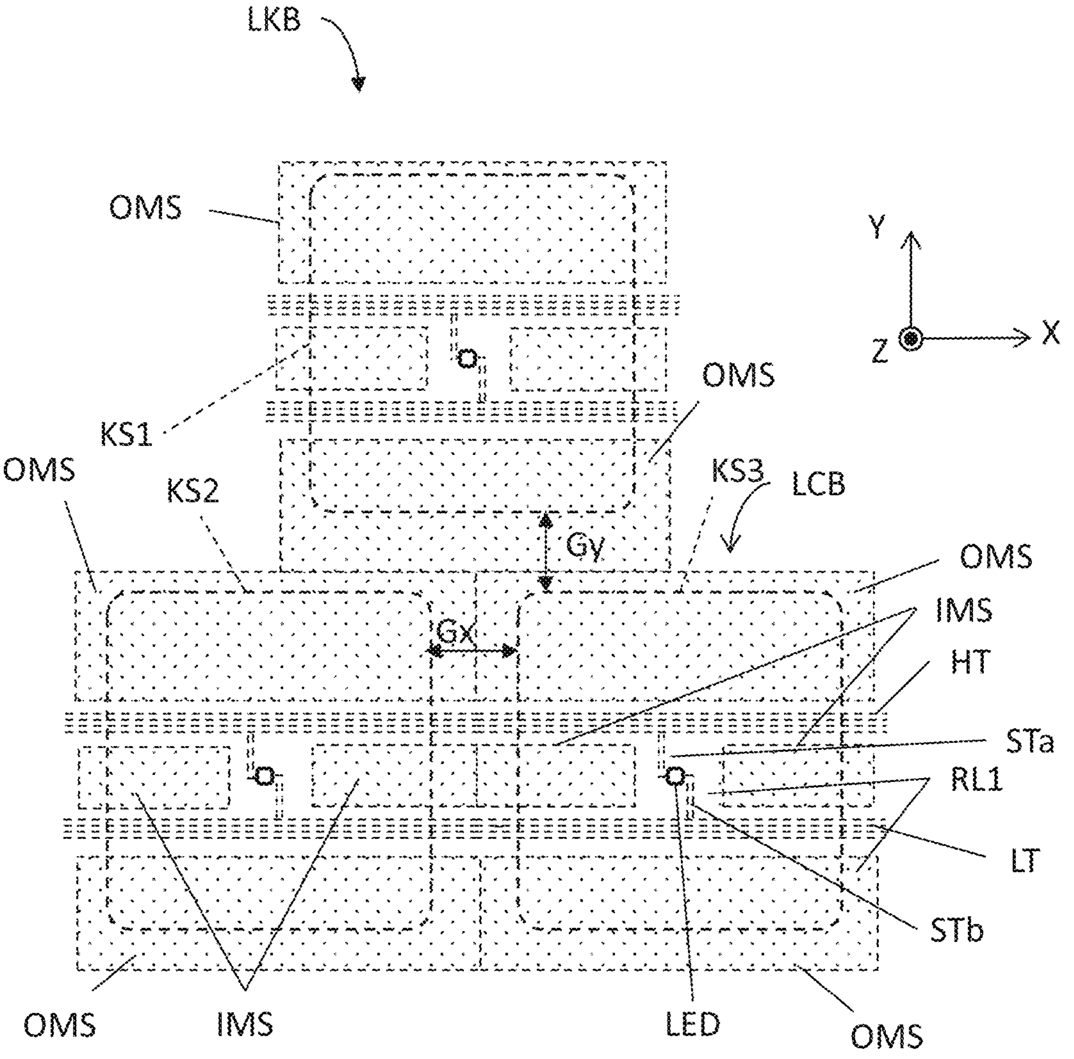
FIG. 10 is another partial top view illustrating the lighting keyboard shown in FIG. 1.

Referring to FIG. 10, FIG. 10 is another partial top view illustrating the lighting keyboard LKB shown in FIG. 1.

As shown in FIG. 10, at least parts of the micro-structure regions OMS, IMS overlap with the gaps Gx, Gy between any two adjacent keyswitches KS1, KS2, KS3. Three adjacent keyswitches KS1, KS2, KS3 may have three adjacent outer micro-structure regions OMS, wherein the three adjacent outer micro-structure regions OMS are joined together in the X and Y directions. The two outer micro-structure regions OMS disposed outside two non-intersecting traces of the lighting board LCB under a keyswitch KS may have the same pattern, which may have same size, same shape and same distance (outside the traces) in two identical regions. Within the projected range of a single keyswitch KS (e.g. square key), the two outer micro-structure regions OMS may have different patterns defined by the keyswitch KS. For two adjacent keyswitches KS in the Y direction, the two outer micro-structure regions OMS may have different patterns defined by the two adjacent keyswitches KS.

Figure 11:
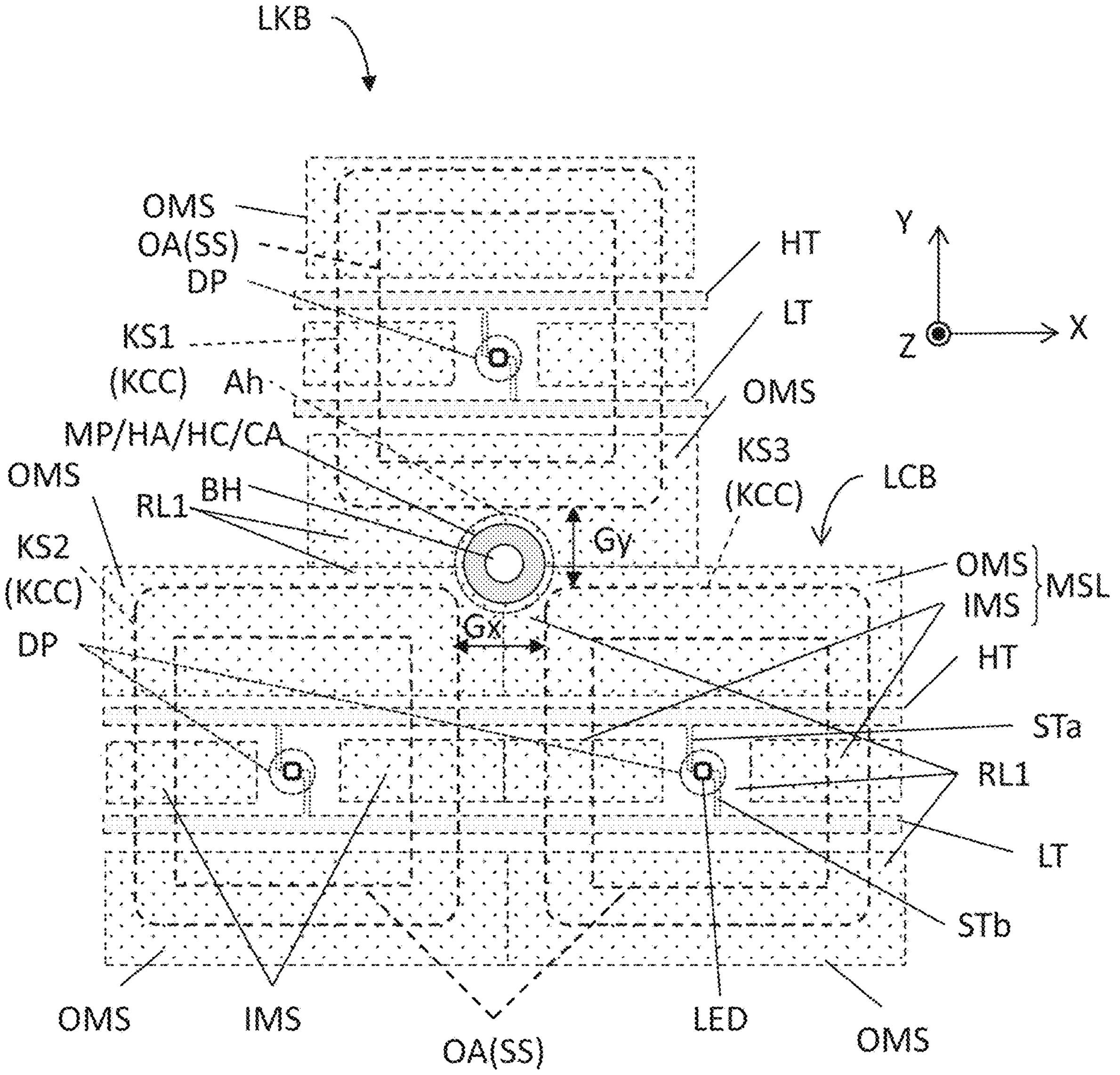
FIG. 11 is another partial top view illustrating the lighting keyboard shown in FIG. 1.

Referring to FIG. 11, FIG. 11 is another partial top view illustrating the lighting keyboard LKB shown in FIG. 1.

As shown in FIG. 11, a board hole BH may be formed on the lighting board LCB, wherein the board hole BH is used for fixing or heat dissipation. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e. the first reflective layer RL1, trace layer and insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer micro-structure regions OMS or any micro-structure. The hole clearance HC without the first reflective layer RL1 may be defined between the first reflective layer RL1 and the board hole BH. The hole clearance HC without an adhesive may be defined between the hole adhesive HA and the board hole BH. The inner micro-structure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer micro-structure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the invention makes the plurality of micro-structure regions on the lighting board not overlap with the two non-intersecting traces. Accordingly, the micro-structure regions specifically arranged on the lighting board can be used to recycle light or assist light output, so as to enhance the overall illuminating consistency. Furthermore, although the technical feature of the invention is depicted to solve the problem of low power illuminant unit, the invention is also applicable to an application of medium or high power illuminant unit in a backlight module.

Moreover, the size of the low power illuminant unit is too small. When the low power illuminant unit is installed on the lighting board, the position of the illuminant unit will easily shift due to the melting of the solder paste, such that the illuminant unit cannot be electrically connected to the lighting board well. The following embodiments of the invention will introduce several technical solutions with special footprint design.

Figure 12A:
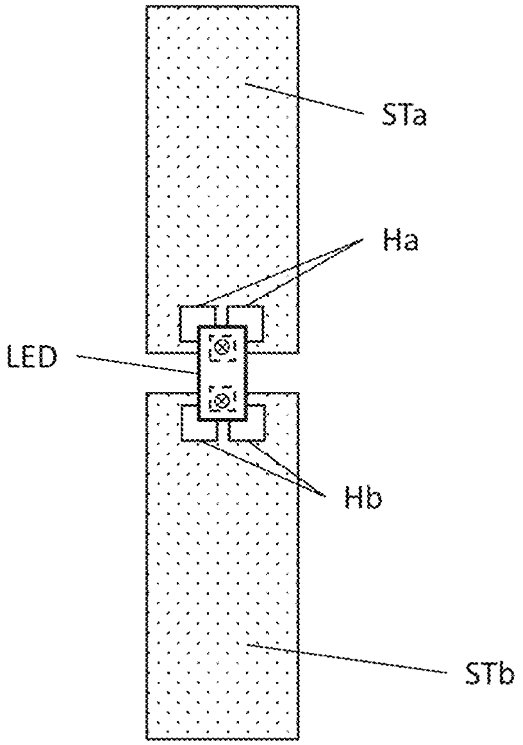
FIG. 12A is a schematic top view illustrating end-to-end connection between the sub-traces of the lighting board, the footprints and the light emitting unit according to another embodiment of the invention.
Figure 12C:
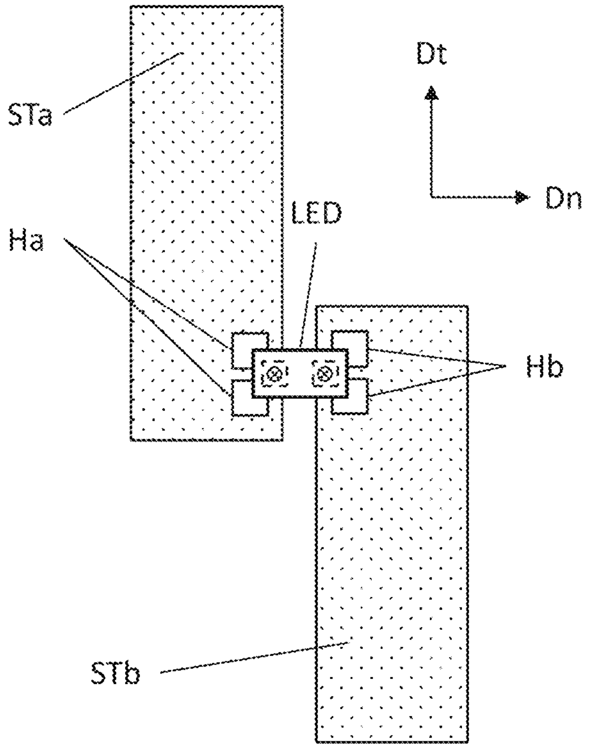
FIG. 12C is a schematic top view illustrating the embodiment shown in FIG. 12A in side connection.
Figure 12B:
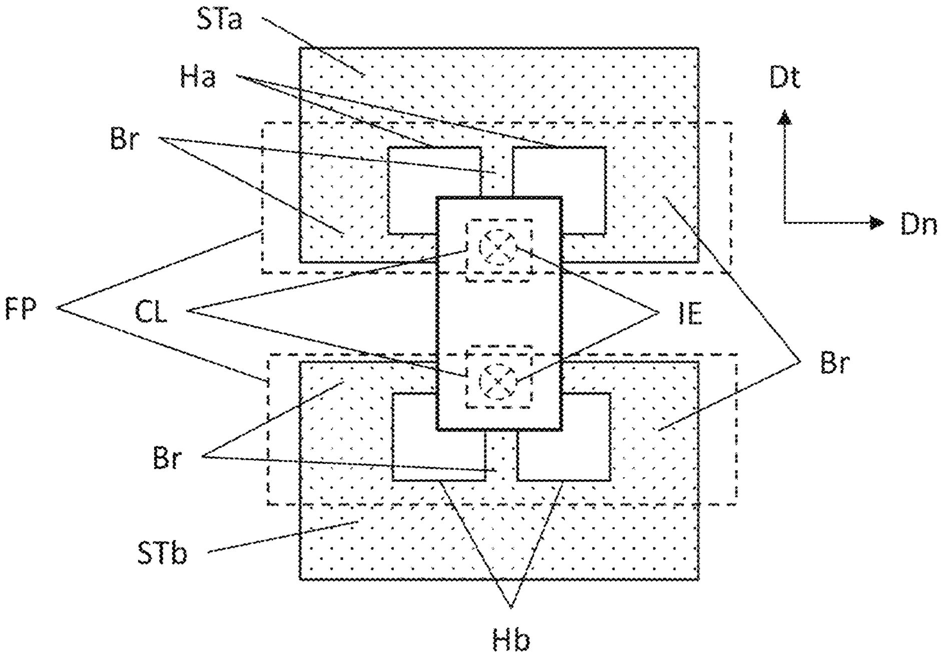
FIG. 12B is partial enlarged view illustrating the embodiment shown in FIG. 12A.

Referring to FIGS. 12A to 12C, FIG. 12A is a schematic top view illustrating end-to-end connection between the sub-traces of the lighting board, the footprints and the illuminant unit according to another embodiment of the invention, FIG. 12B is partial enlarged view illustrating the embodiment shown in FIG. 12A, and FIG. 12C is a schematic top view illustrating the embodiment shown in FIG. 12A in side connection.

As shown in FIGS. 12A and 12B, two sub-traces STa/STb (see the aforesaid embodiments and FIGS. 3, 8 and 9) extend along a trace direction Dt, there is a footprint FP at the end of each of the two sub-traces STa/STb, and there is a footprint gap FG between two footprints FP. Each footprint FP may be integrally formed with the circuit (e.g. traces HT/LT/STa/STb) of the lighting board LCB by printing conductive wires or integrally formed with the circuit of the lighting board LCB by copper foil substrate etching process. However, each footprint FP may also be formed by overmolding process, or made of different material from the circuit of the lighting board LCB. Each footprint FP take an intersection point IE as the end, and the distance between two intersection points IE is also the shortest distance between two footprints FP. The footprint gap FG between the two intersection points IE is smaller than a long side of the illuminant unit LED, for example, the gap between the two intersection points IE is close to 0.5 times the long side of the illuminant unit LED or shorter. The intersection point IE may essentially be the tail point of the adjacent ends of the two footprints FP, or the geometric center point of the adjacent ends of the two footprints FP. The two footprints FP of the invention respectively have at least two branches extending outward from the intersection points IE, so as to define at least one hollow area Ha/Hb. As show in FIGS. 12A and 12B, each footprint FP has three branches Br, wherein the middle branch Br extends straight outward from the intersection points IE to connect the sub-traces STa/STb. The remaining left and right two branches Br extend outward to form L-shaped paths to connect the sub-traces STa/STb. The three branches Br of each footprint FP jointly define two hollow areas Ha/Hb. The border between the two hollow areas Ha/Hb extends along with the middle branch Br. Structurally, in order to form a concave structure as the hollow area Ha or Hb, at least two branches Br are required to define the concave section of the hollow area Ha or Hb.

The positive and negative electrodes of the illuminant unit LED are electrically connected to the two footprints FP through a conductive layer CL respectively, and the connection position is located at the two intersection points IE or the adjacent area thereof. The conductive layer CL may be achieved, for example, by solder paste or an alternative material. The thickness and area of the conductive layer CL will affect the degree of offset of the illuminant unit LED during mounting process. Therefore, the printing of the conductive layer CL must be concentrated on the intersection point IE of the two footprints FP as much as possible and extend along with the branch Br finitely. The connection direction of the positive and negative electrodes of the illuminant unit LED or the long side of the illuminant unit LED is parallel to the trace direction Dt. The width of the two footprints FP (flat side) may be set to be at least 0.8-1.5 times the short side of the LED. If the illuminant unit LED shifts along the normal direction Dn of the traces STa/STb or along the short side direction of the illuminant unit LED, there is still a considerable chance that the positive and negative electrodes of the illuminant unit LED may be electrically connected to the two footprints FP. If the illuminant unit LED shifts along the trace direction of the traces STa/STb or along the long side direction of the illuminant unit LED, the shift must be more than 0.5 times the length of the long side of the illuminant unit LED, such that the illuminant unit LED cannot be electrically connected to the two footprints FP at the same time. No matter how the illuminant unit LED shifts, the illuminant unit LED at least partially overlaps with one hollow area Ha or Hb of one footprint FP, e.g. a corner or a side of the illuminant unit LED overlaps with at least one hollow area Ha or Hb. The overall size of the two footprints FP (including the hollow area Ha or Hb, the branch Br and the footprint gap FG) may be set to be at least 1.2 times the illuminant unit LED; or the two footprints FP respectively have at least one branch Br to form a pair of flat sides parallel to each other, and the short side of the illuminant unit LED is preferably smaller than the width of the pair of flat sides of the two footprints FP. Accordingly, even in the case of maximum offset, the illuminant unit LED (either side) does not exceed the outermost periphery of any footprint FP. In the ideal case of no offset during mounting process, all four corners of the illuminant unit LED may overlap with the hollow area Ha or Hb respectively. However, under the premise that the process parameters are highly stable, the flat side of the footprint FP may be smaller than or equal to the short side of the illuminant unit LED. Even so, at least the illuminant unit LED (such as a specific side or corner) must be able to overlap with the hollow area Ha/Hb to maintain the basic offset prevention mechanism.

The first significance of the existence of the hollow area Ha/Hb is to provide at least two branches Br for each footprint FP, which may be used to connect the positive/negative electrodes of the illuminant unit LED. Secondly, the intersection point IE at the intersection of the branches Br (or the end of the junction of the two hollow areas Ha/Hb) may be used as the positioning point of the illuminant unit LED in the automated manufacturing process. Furthermore, the conductive layer CL is easy to flow along the branch Br during melting, and the existence of the hollow area Ha/Hb prevents the conductive layer CL from flowing toward the hollow area Ha/Hb to a specific extent during melting. Still further, the width of each branch Br may only be 0.5 times or thinner than the short side of the illuminant unit LED, so as to limit the range/angle of the molten flow of the conductive layer CL from spreading, and further limit the angle/path of the illuminant unit LED to shift. Thus, it may ensure that the illuminant unit LED will shift along the branch Br, and improve the yield rate of the illuminant unit LED electrically connecting the two footprints FP and the two traces STa/STb.

Referring to FIGS. 12A to 12C, the traces STa/STb shown in FIGS. 12A and 12B are in end-to-end state, and two hollow areas Ha and two hollow areas Hb are arranged perpendicular to the trace direction Dt. FIG. 12C is quite different. The traces STa/STb partially overlap in the vertical trace direction Dt and are in side-to-side state. Therefore, the positions of the two footprints FP are rotated by 90 degrees, and the two hollow areas Ha and the two hollow areas Hb are all arranged along the trace direction. Regardless of the end-to-end or side-to-side connection, the hollow area Ha/Hb of the footprint FP and the branch Br may effectively improve the yield rate of the illuminant unit LED electrically connecting the two footprints FP and the two traces STa/STb.

Referring to FIGS. 13A to 13F along with FIGS. 12A to 12C, FIGS. 13A to 13F are schematic top views illustrating connection structure between the sub-traces of the lighting board, two footprints and the illuminant unit according to different embodiments of the invention.

Figure 13A:
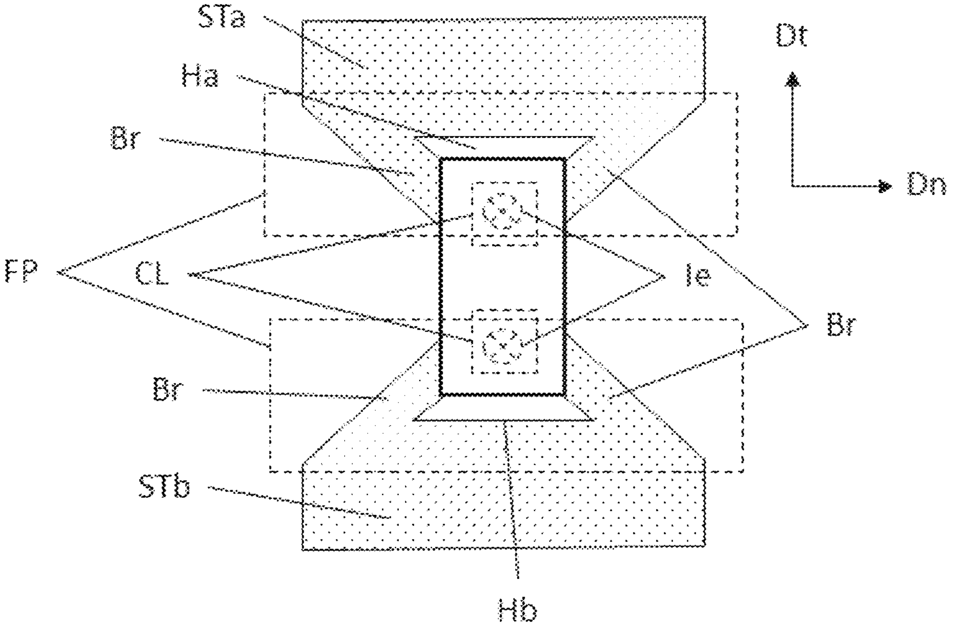
FIGS. 13A to 13F are schematic top views illustrating connection structure between the sub-traces of the lighting board, two footprints and the light emitting unit according to different embodiments of the invention.
Figure 13B:
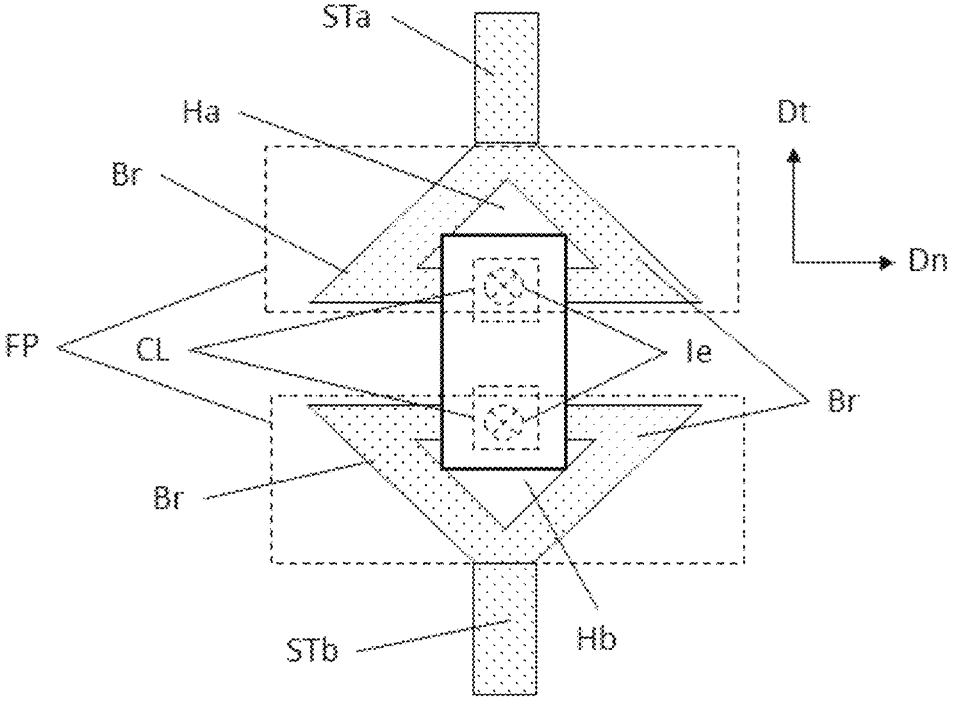

As shown in FIGS. 12A to 12C, three branches Br form a T shape, and each branch Br is at least partially parallel to the short side and the long side of the illuminant unit LED, but the invention is not so limited. As shown in FIG. 13A, each footprint FP has only two branches Br extending obliquely outward from the intersection point IE, and the two branches Br of each footprint FP form an obtuse angle and finally define a hollow area Ha/Hb with the two traces STa/STb. Although the illuminant unit LED in FIG. 13A still at least partially overlaps with the hollow areas Ha and/or Hb, the distance between the two branches Br on the same side of different footprints FP will become larger and larger when the illuminant unit LED shifts leftward and rightward along the normal direction Dn. Therefore, the obtuse angle included between the two branches Br of each footprint FP should not be too small, for example, between 1500 and 180°, so as to prevent the illuminant unit LED from shifting beyond the width of the two electrodes. A preferred embodiment similar to FIG. 13A is shown in FIG. 13B. It is also a footprint FP similar to a triangle, and two angular branches Br form a flat side opposite to the flat side formed by the branch Br of another footprint FP. In this way, when the illuminant unit LED shifts, there will be no problem of changing the distance between the two branches Br on the same side of different footprints FP. Moreover, the width of the traces STa/STb in FIG. 13B is narrow (e.g. the copper wire formed by etching the copper foil substrate). In contrast, the width of the traces STa/STb in FIG. 13A are wider (e.g. it is made by printing a metal paste with lower conductivity than the etched copper wire). Both have no direct impact on the electrical connection between the footprint FP and the illuminant unit LED.

Figure 13C:
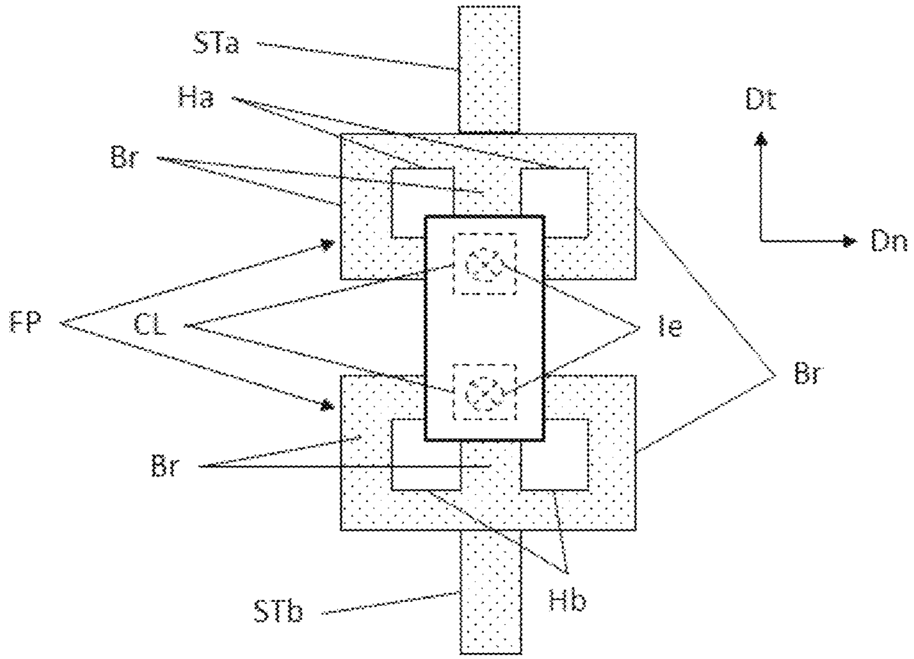

As shown in FIG. 13C, each of the two footprints FP has three branches Br, and the arrangement is also similar to that in FIGS. 12A and 12B. The branch Br in the middle extends straight outward from the intersection point IE to connect the sub-traces STa/STb, and the remaining left and right two branches Br extend outward from the intersection point IE in a U-shaped path to connect the sub-traces STa/STb. The width of the trace STa/STb in FIG. 13C is narrow and the width of the trace STa/STb in FIGS. 12A and 12B is wide in comparison. However, as mentioned in the above, the width of the traces STa/STb has little effect on the electrical connection between the footprint FP and the illuminant unit LED.

Figure 13D:
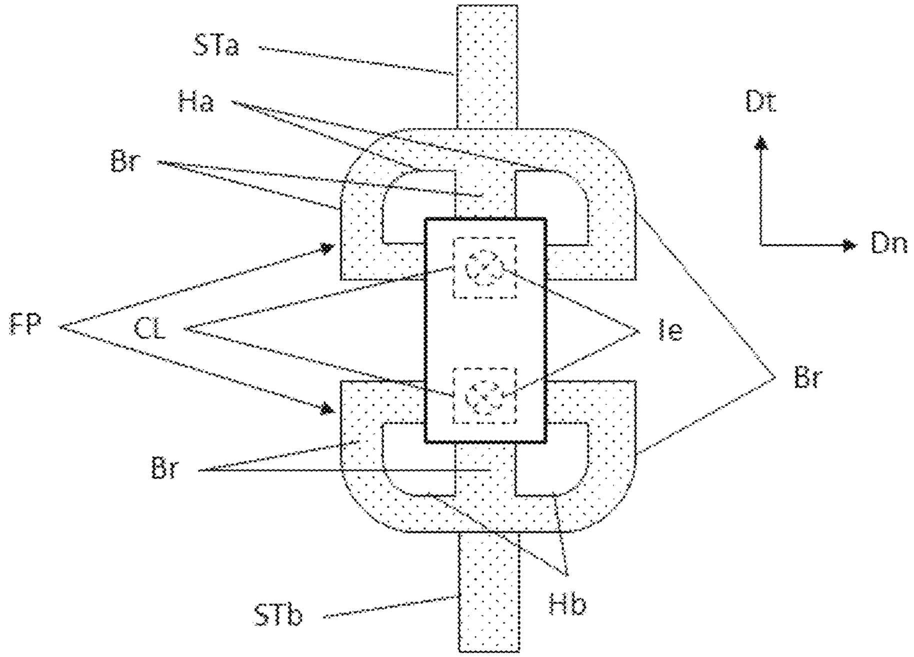
Figure 13E:
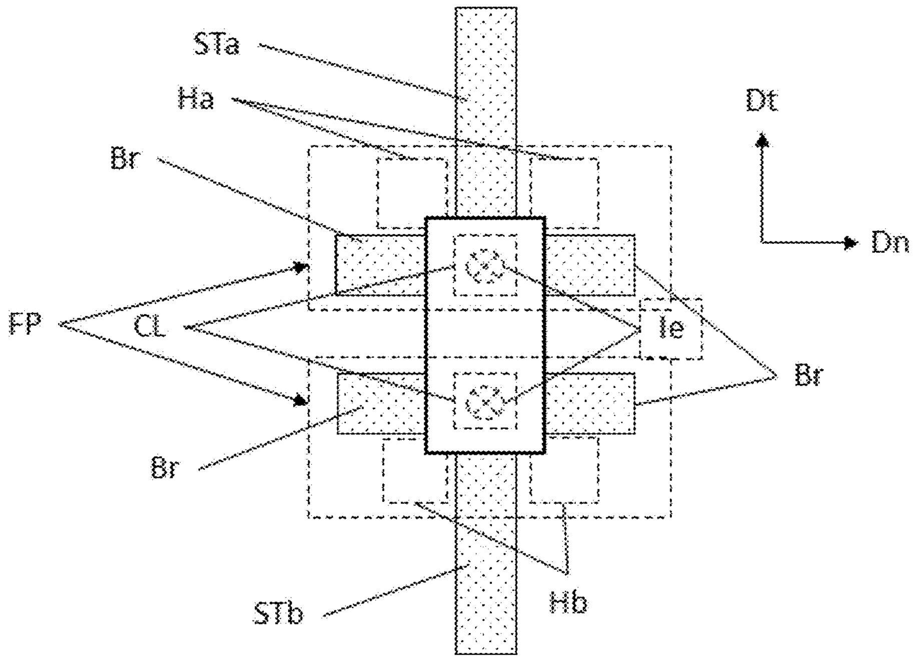

As shown in FIG. 13D, each of the two footprints FP has three branches Br, and the arrangement is also similar to that in FIG. 13C. In FIG. 13D, the branch Br in the middle extends straight outward from the intersection point IE to connect the sub-traces STa/STb, and the remaining left and right two branches Br extend outward from the intersection point IE in a U-shaped path to connect the sub-traces STa/STb. The difference is in the shape of the footprint FP. The shape of the footprint FP in FIG. 13D is closer to a semicircle, that is, both the left and right branches Br in FIG.

13D have arc-shaped chamfers, which is more corresponding to the aforesaid FIG. 3 or more circular arcs of the light guide hole L0 in subsequent FIGS. 14A to 14D. In this way, it may better match and increase the amount of light entering the side of the light guide plate LGP. Although each footprint FP in FIG. 13E has a branch Br extending outward from the intersection point IE to form a flat side, but only the middle branch Br is connected to the sub-trace STa/STb. The left and right branches Br extend to form a straight path outward from the intersection point IE toward the normal direction Dn, and neither extend to the sub-trace STa/STb nor connect the trace STa/STb. However, the middle branch Br along with the left and right branches Br still define the hollow area Ha/Hb, such that the illuminant unit LED at least partially overlaps with one of the hollow areas Ha/Hb.

Figure 13F:
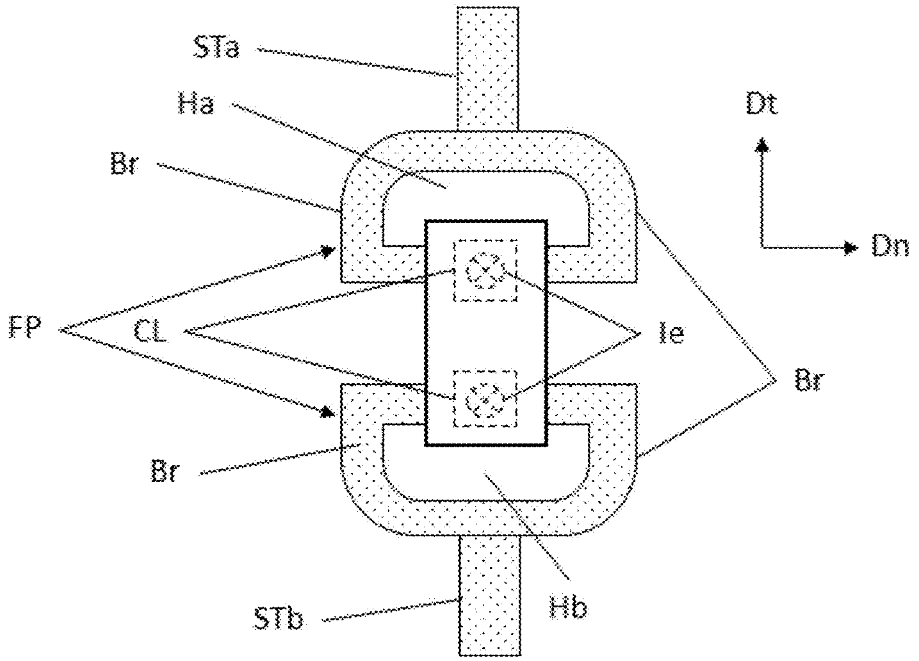

The footprint FP in FIG. 13F is similar to the footprint FP in FIG. 13D, but the middle branch line Br is omitted. Only the left and right branches Br extend outward from the intersection point IE in a U-shaped path to connect the sub-traces STa/STb. The two footprints FP and the branches Br thereof in FIG. 13F also form a pair of flat sides parallel to each other. Each of the two footprints FP has only one hollow area Ha/Hb, such that (two short sides of) the illuminant unit LED at least partially overlaps with at least one of the hollow areas Ha/Hb. The two short sides of the illuminant unit LED in FIG. 13F cross the hollow area Ha/Hb respectively, which is also similar to the triangular footprint FP in FIGS. 13A and 13B, but the footprint FP and the hollow area Ha/Hb in FIG. 13F are larger than those in FIGS. 13A and 13B. Furthermore, in FIGS. 13A to 13F, each pair of footprints FP is connected to the illuminant unit LED in an end-to-end structure, but in practice, based on the descriptions of the aforesaid embodiments, the different types of footprints FP in FIGS. 13A to 13F of the invention may all be applied to the side-to-side lateral connection structure similar to FIG. 12C.

In addition, the area around the low power illuminant unit is the area with the highest brightness. Expanding the light reflection angle in this area is the key to increase the amount of light entering the side of the light guide plate, increase the ratio of lateral transmission, and improve the uniformity of light emission. However, the area around the illuminant unit is the physical connection area between the illuminant unit LED and the lighting board LCB. How to make the illuminant unit LED be electrically connected to the lighting board LCB and expand the light reflection angle at the same time is a significant issue in the design of the electrical connection structure of the illuminant unit LED.

Figure 14A:
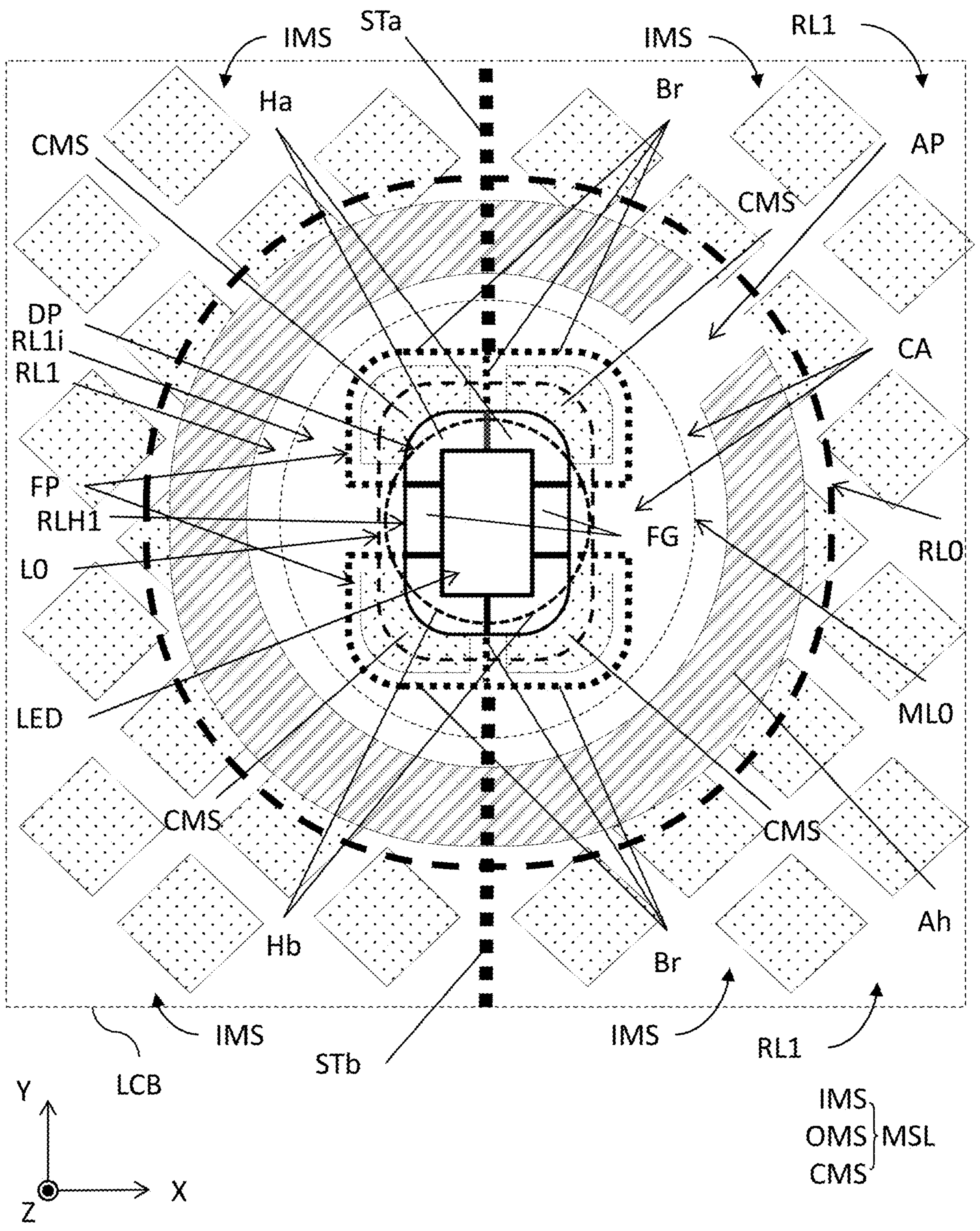
FIG. 14A is a partial top view illustrating optical structure of the backlight module around the light emitting unit according to another embodiment of the invention.
Figure 14B:
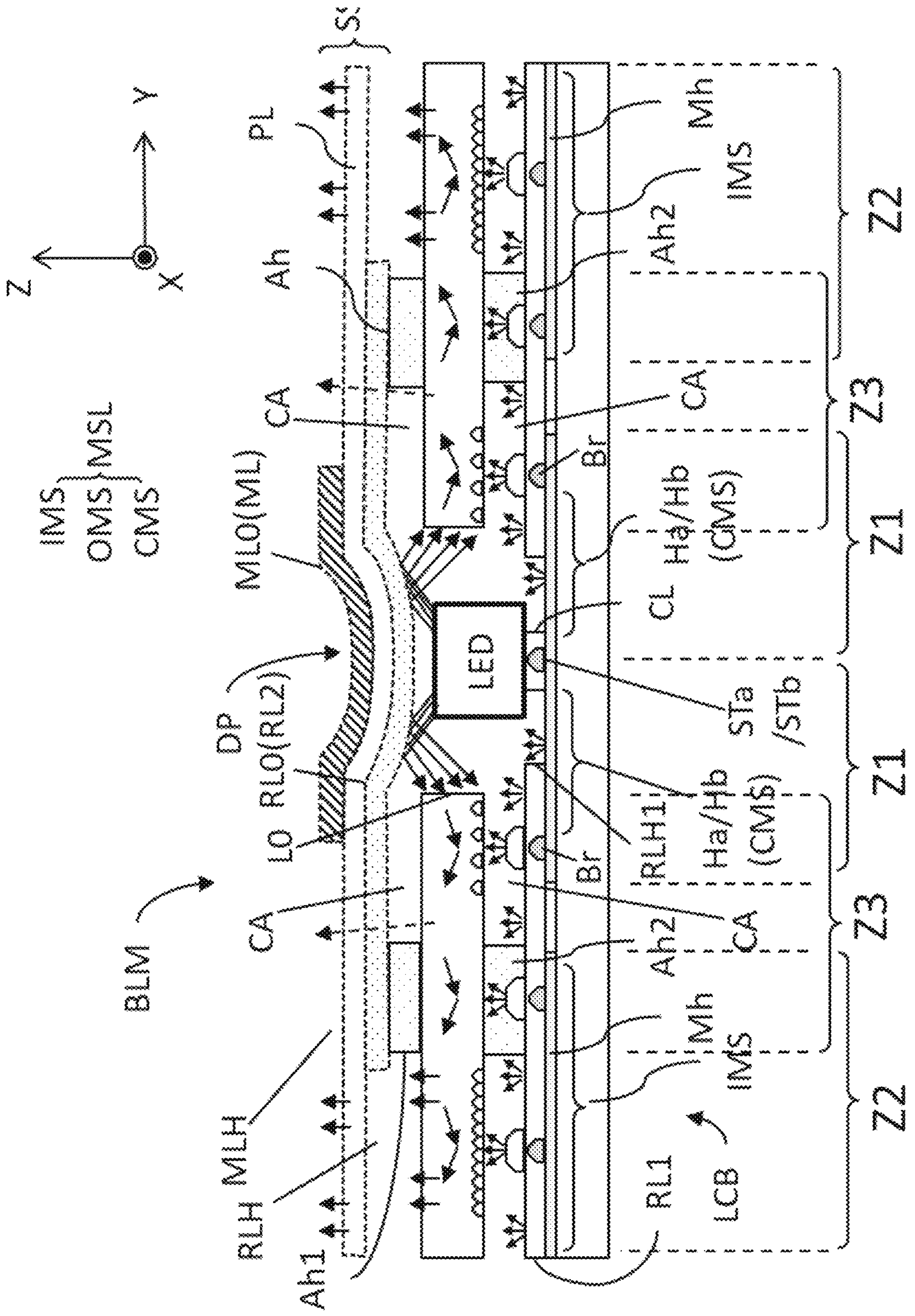
FIG. 14B is a partial sectional view illustrating the backlight module of the embodiment shown in FIG. 14A.
Figure 14C:
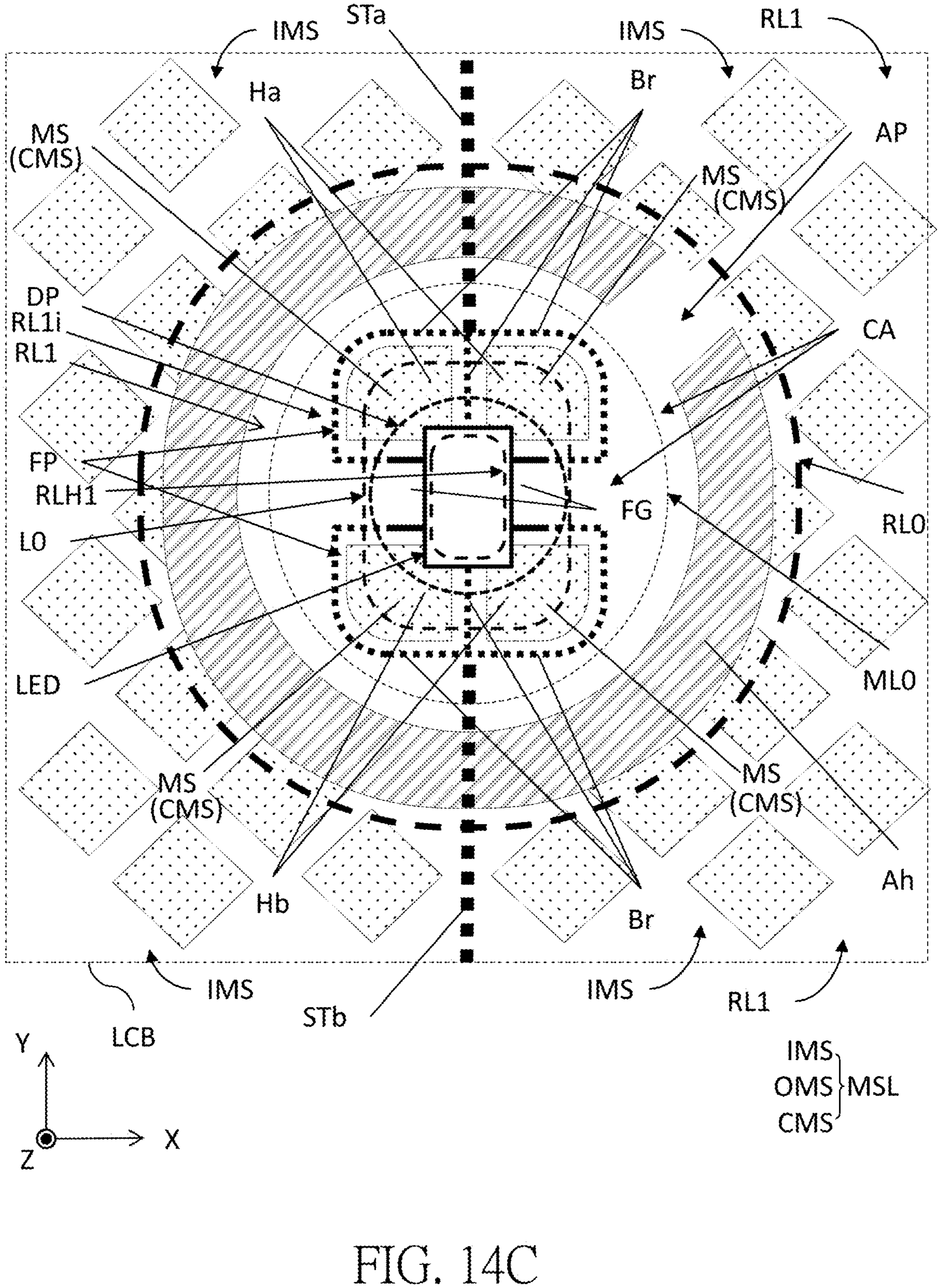
FIG. 14C is a partial top view illustrating optical structure of the backlight module around the light emitting unit according to another embodiment of the invention.
Figure 14D:
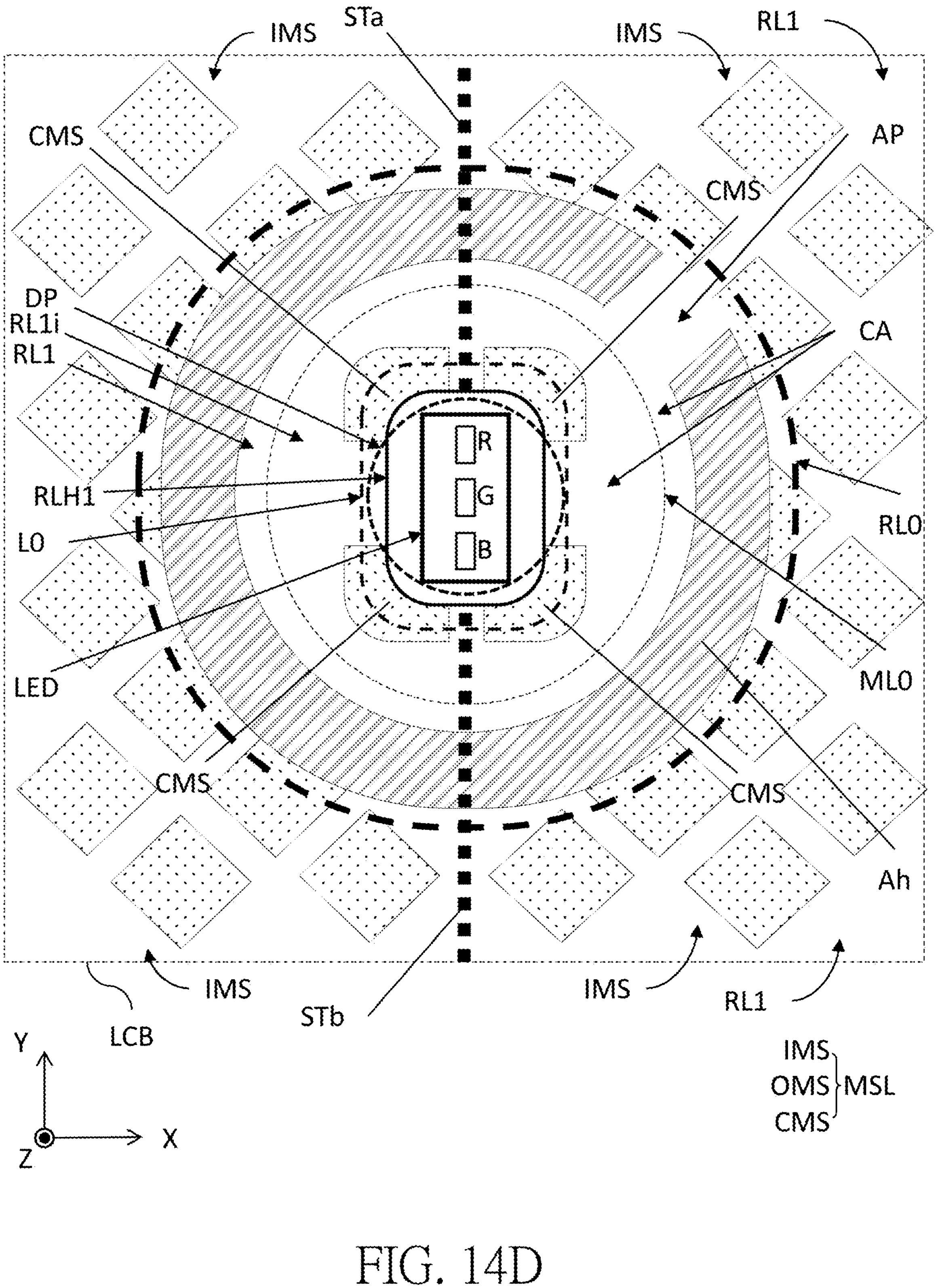
FIG. 14D is a partial top view illustrating optical structure of the backlight module according to a derivative embodiment of FIG. 14A of the invention.

Referring to FIGS. 14A, 14B and 14C, FIG. 14A is a partial top view illustrating optical structure of the backlight module around the illuminant unit according to another embodiment of the invention. FIG. 14B is a partial sectional view illustrating the backlight module of the embodiment shown in FIG. 14A. FIG. 14C is a partial top view illustrating optical structure of the backlight module around the illuminant unit according to another embodiment of the invention. FIG. 14D is a partial top view illustrating optical structure of the backlight module according to a derivative embodiment of FIG. 14A of the invention.

As shown in FIGS. 14A and 14B, the height difference between six branches Br and four hollow areas Ha/Hb of the two footprints FP generates a concave-convex structure covered by the first reflective layer RL1, such that the entire area of each footprint FP may form a core micro-structure region CMS surrounding at least one part of the illuminant unit LED, wherein both the concave region (hollow area Ha/Hb) and the convex region (branch Br) may play the role of the micro-structure region MS respectively. These footprints FP and the core micro-structure region CMS are located under the inner reflective section RL0 of the shielding sheet SS. Even if there are no special footprint FP and its hollow area Ha/Hb and branch Br, as long as the first reflective layer RL1 covered around the illuminant unit LED has the aforesaid concave-convex structure, the core micro-structure region CMS may still be formed around the illuminant unit LED. Thus, one or more core micro-structure regions CMS surrounding the illuminant unit LED may further reflect and diffuse the light reflected downward by the inner reflective section RL0 of the shielding plate SS, and increase the amount of light entering the side of the light guide hole L0, so as to improve the lateral transmission ratio and enhance the overall luminous uniformity of the key KS and the lighting keyboard LKB.

From the perspective of the overall structure, with the illuminant unit LED as the center, the backlight module BLM of the embodiment of the invention provides a plurality of light uniform areas to achieve a uniform light emission effect. The plurality of light uniform areas of the backlight module BLM at least comprises a first uniform light area Z1 and a second uniform light area Z2. The first uniform light area Z1 surrounds the illuminant unit LED. The first uniform light area Z1 comprises an inner ring section RL1*i* of the first reflective layer RL1 and a pair of footprints FP. The pair of footprints FP are located on the lighting board LCB and configured to connect the illuminant unit LED. The inner ring section RL1*i* of the first reflective layer RL1 at least partially covers the pair of footprints FP, such that the inner ring section RL1*i* of the first reflective layer RL1 reflects and diffuses light of the illuminant unit LED. The second uniform light area Z2 surrounds the first uniform light area Z1. The second uniform light area Z2 comprises a pair of micro-structure regions MS apart from each other and located on the first reflective layer RL1. The pair of micro-structure regions MS jointly surround the pair of footprints FP. The pair of micro-structure regions MS reflect and diffuse light of the lighting emitting unit LED transmitted through the first uniform light area Z1.

The first uniform light area Z1 closest to the illuminant unit LED provides one or more core micro-structure regions CMS around the illuminant unit LED through the two footprints FP on the lighting board LCB and the first reflective layer RL1. The combination of the branch Br and the hollow area Ha/Hb makes the first uniform light area Z1 have a concave-convex structure. Since the footprint FP and the core micro-structure region CMS thereof at least partially overlap with the inner reflective section RL0 of the shielding sheet SS in the Z direction, they can be used to reflect, diffuse and open the angle of light from the inner reflective section RL0 and make the light incident toward the side of the light guide hole L0. In the first uniform light area Z1, the reflective layer hole RLH1 may overlap with the two footprints FP and the hollow area Ha/Hb thereof, the branch Br and the core micro-structure region CMS, and the light guide hole L0 may also overlap with the two footprints FP and the hollow area Ha/Hb thereof, the branch Br and the core micro-structure region CMS.

Secondly, the second uniform light area Z2 surrounds the illuminant unit LED at a further distance, and also surrounds the light guide hole L0 and the reflection layer hole RLH1. The second uniform light area Z2 comprises two inner micro-structure regions IMS separated by a pair of non-intersecting sub-traces STa/STb on the lighting board LCB (also refer to the aforesaid embodiments shown in FIGS. 3, 10 and 11). The two inner micro-structure regions IMS are located on the upper surface of the first reflective layer RL1, which jointly surround at least one part of the first uniform light area Z1. Although the two inner micro-structure regions IMS may only partially overlap with the inner reflection section RL0 of the shading sheet SS, less light directly coming from the inner reflection section RL0 reach the inner micro-structure regions IMS. However, during the lateral transmission in the light guide plate LGP, the light with an angle smaller than the critical angle cannot continue to be fully reflected inside the light guide plate LGP and pass through the lower surface of the light guide plate LGP. The emitted light may be recycled by the two inner micro-structure regions IMS and then enter the light guide plate LGP to continue to be transmitted laterally through reflection and diffusion.

In addition, the backlight module BLM may set a third uniform light area Z3 between the first uniform light area Z1 and the second uniform light area Z2. The third uniform light area Z3 may overlap with the first uniform light area Z1 and/or the second uniform light area Z2 in the Z direction. The third uniform light area Z3 mainly comprises an adhesive layer Ah (e.g. the adhesive layer Ah1 and/or Ah2 in FIG. 14B) disposed above the lighting board LCB in FIG. 14A. Although there is a need to use glue for positioning between the layers of the backlight module BLM, the glue should also be taken into consideration in optical design. First, the adhesive layer Ah1/Ah2 may be an adhesive material capable of transmitting light and has a good optical coupling effect. While excessive concentration of light around the illuminant unit LED is an original problem with low illuminant unit, it is also possible to overkill in the implementation, for example, resulting in the inner outlet KC0 closer to the center of the keycap KC in FIG. 3 has insufficient light. At this time, the adhesive layer Ah1/Ah2 may be used to fine-tune and increase the light intensity, as a means of post-correction. For further explanation, the adhesive layer Ah1 may surround the light guide hole L0, the reflective layer hole RLH1 and the illuminant unit LED and is disposed on the upper surface of the light guide plate LGP (i.e. between the light guide plate LGP and the shielding sheet SS), and the adhesive layer Ah2 may surround the light guide hole L0, the reflective layer hole RLH1 and the illuminant unit LED and is disposed on the lower surface of the light guide plate LGP (i.e. between the light guide plate LGP and the lighting board LCB).

The adhesive layer Ah/Ah1/Ah2 is not suitable for being too close to the illuminant unit LED, because the optical coupling effect of the adhesive layer Ah/Ah1/Ah2 will make the light emitted by the illuminant unit LED too concentrated and cannot be diffused. If the adhesive layer Ah/Ah1/Ah2 is in contact with the illuminant unit LED during the manufacturing process, its viscosity may cause the illuminant unit LED to peel off. Therefore, the adhesive layer Ah/Ah1/Ah2 must be applied under proper control, including setting the non-adhesive area CA or reducing the width of the adhesive layer. The non-adhesive area CA may be disposed between the adhesive layer Ah/Ah1/Ah2 and the light guide hole L0, or between the adhesive layer Ah/Ah1/Ah2 and the reflective layer hole RLH1. In the Z direction, the non-adhesive area CA may be disposed on the upper surface of the light guide plate LGP (i.e. between the light guide plate LGP and the shielding sheet SS), and the non-adhesive area CA may also be disposed on the lower surface of the light guide plate LGP (i.e. between the light guide plate LGP and the lighting board LCB). In practice, the adhesive layer Ah1/Ah2 may be disposed either one or at the same time. An adhesive gap AP is another adjusting manner for applying the adhesive layer Ah1/Ah2. If there is a need to increase the outline halo of the keycap KC or the brightness of the outer characters (outer outlet KC1) in a specific direction, the adhesive gap AP may be formed on the adhesive layer Ah1/Ah2 to correspond to the required position or outlet. The adhesive gap AP may allow more light to continue to transmit outward laterally and smoothly, thereby improving the brightness of the light in this direction.

On the whole, the first uniform light area, the second uniform light area, and the third uniform light area respectively cover different blocks and different areas of the illuminant unit LED in the 360-degree range from the Z direction. Due to the different arrangements of the optical components, the amount of light emitted upward from the first uniform light area/second uniform light area/third uniform light area may be relatively similar. In addition, there are other components that may be used as the adjusting manner. For example, the micro-structure region MS on the surface of the light guide plate LGP may be used in conjunction with the core micro-structure region CMS, the inner micro-structure region IMS and the outer micro-structure region OMS of the first reflective layer RL1 of the lighting board LCB to increase effects of reflection and diffusion. Furthermore, using the inner reflective section RL0 of the shielding sheet SS to cover the adhesive layer Ah1/Ah2 may also reduce light loss caused by the adhesive layer Ah1/Ah2 and recycle light.

In the Z direction, as shown in FIGS. 14A and 14B, the light guide hole L0 is larger than the reflective layer hole RLH1 of the first reflective layer RL1, and the reflective layer hole RLH1 is larger than the illuminant unit LED. That is to say, the wall of the reflective layer hole RLH1 surrounds the illuminant unit LED and does not completely cover the two footprints FP. In other words, the reflective layer hole RLH1 is located between the illuminant unit LED and the light guide hole L0, and a part (the innermost ring area) of the first reflective layer RL1 is located between the reflective layer hole RLH1 and the light guide hole L0. In this way, the two footprints FP are at least partially exposed in the reflective layer hole RLH1. The exposed range of the footprint FP directly affects the range in which the illuminant unit LED can be well connected when the offset occurs. Therefore, the more the footprint FP is exposed, the better connection between the illuminant unit LED and the footprint FP can be ensured. At the same time, the exposed footprint FP means that there is no reflection provided by the first reflective layer RL1, but this does not mean that the area in the reflective layer hole RLH1 cannot provide effects of reflection and diffusion. First, since the footprint FP is copper or copper alloy (or other alternative metals), the reflective layer hole RLH1 may provide effects of reflection and diffusion in the light guide hole L0 by the exposed branch Br of the two footprints FP (located between the illuminant unit LED and the reflective layer hole RLH1). Secondly, the hollow area of the exposed area of the two footprints FP (including the hollow area Ha/Hb and the footprint gap FG) is usually the substrate of the exposed lighting board LCB (located below the circuit and the footprint FP). As long as the exposed upper surface of the substrate can reflect light, no matter whether the upper surface of the substrate itself is reflective, or there is a metal solder/conductive layer, or there is glue that ensures the fixation of the illuminant unit LED, it can also provide effects of reflection and diffusion.

Referring to FIG. 14C, when the mass production yield has stabilized, and the mounting accuracy, mounting temperature, conductive layer flow, and mounting offset of the illuminant unit LED are well controlled, a smaller reflective layer hole RLH1 may be used. When the reflective layer hole RLH1 is small and even when four sides of the illuminant unit LED is surrounded by the wall of the reflective layer hole RLH1, the first reflective layer RL1 may cover almost the entire area of the lighting board LCB within the range of the light guide hole L0, thereby preventing any part of the footprint FP from being exposed. At this time, the completely covered two footprints FP, the branch Br and the plurality of hollow areas Ha/Hb may form a plurality of micro-structures with complete shape and larger area, so as to form the core micro-structure region CMS surrounding the illuminant unit LED. If the area of the core micro-structure region CMS is large, much light may be diffused in the early stage, such that much light can smoothly enter the side wall of the light guide hole L0. The core micro-structure region CMS may be partially located within the range of the light guide hole L0 and partially located outside the wall of the light guide hole L0. Needless to say, if the size and shape of the reflective layer hole RLH1 is similar to that of the illuminant unit LED or slightly larger than the illuminant unit LED, a similar effect may also be achieved.

Based on the arrangements of the aforesaid embodiments, in FIGS. 14A to 14C, a part of the branches Br of the two footprints FP jointly surround at least one part of the light guide hole L0. The hollow areas Ha/Hb of the two footprints FP jointly surround and/or overlap with the reflective layer hole RLH1. A part of the inner ring section RL1*i* of the first reflective layer RL1 between the reflective layer hole RLH0 and the light guide hole L0 overlaps with at least one part of the two footprints FP, such that a part of the first reflective layer RL1 exposed in the light guide hole L0 together with a part of the footprint FP may form a concave-convex reflection/diffusion structure, such as the core micro-structure region CMS. Finally, although each footprint FP in each embodiment of the invention is connected to the sub-traces STa/STb for example, but, in practical applications, each footprint FP may also be selectively and directly connected to the main traces HT/LT mentioned in the aforesaid embodiments and FIGS. 2 to 11 as required.

Referring to FIG. 14D, the illuminant unit LED encapsulates three-color dies to provide three-color light (e.g. red, green and blue). In order to achieve a good light mixing effect for the three-color dies of the illuminant unit LED, the core micro-structure region CMS surrounding the illuminant unit LED is also formed on the inner ring section RL1*i* of the first reflective layer RL1 (no matter whether there is the aforesaid footprint FP or what the type of the footprint FP is), so as to increase the light mixing effect of the three-color dies of the illuminant unit LED by improving the effects of reflection and diffusion. In addition, the arrangement of the three-color dies may be arranged continuously from long side to long side. The advantage is that the illuminant unit LED is shorter and the offset of the mounting process is less likely to interfere with the small-sized light guide hole L0, but the disadvantage is that the light mixing effect is poor. Since the long side of the die with a large light output is blocked by the long side of the adjacent die, it is difficult for different color lights to be transmitted interlacedly. Another manner is shown in FIG. 14D. The long side of each of the three-color dies is parallel to the long side of the illuminant unit LED. That is to say, the long side of each of the three-color dies is arranged along the Y direction, or the three-color dies are arranged consecutively from short side to short side. In this way, the long sides of the dies with a large amount of light output and a large light output range are facing the X direction in the figure, overlapping and staggering with each other, and a better light mixing effect may be obtained in two larger fan-shaped ranges in the X direction. At the same time, in the Y direction, because the short sides of the dies are adjacent to each other, the short sides of the dies emit less light and the range of light output is small, the light blocked by the short sides of the dies is also less, and the problem of polarization is also less.

As mentioned in the above, the embodiments of the invention shown in FIGS. 12A to 14C simultaneously solve the problem of connection stability of the illuminant unit and the problem of excessive concentration of light emitted from adjacent areas of the illuminant unit. In addition to using the footprints with the hollow areas to ensure that the illuminant unit can still be connected well when the illuminant unit is offset during mounting process, the footprints and the hollow areas thereof are further used together with the first reflective layer to form a light uniform design in the first uniform light area. Furthermore, combined with the inner micro-structure regions of the lighting board in the second uniform light area and the adhesive layer and the non-adhesive area in the third uniform light area, the invention provides different light uniform schemes for different blocks along the outward optical path of the illuminant unit, such that a high degree of uniformity can be achieved for the character brightness and keycap halo of a single key and even the entire keyboard.

Furthermore, the micro-structure regions MS, LMS, inner micro-structure region IMS, outer micro-structure region OMS, core micro-structure region CMS, etc. mentioned in the aforesaid embodiments are all regions consisting of a plurality of micro-structures. In practice, as long as they are disposed on a surface of an identical component, the aforesaid micro-structure regions may be selectively integrated and disposed on one or more micro-structure layers MSL. For example, the micro-structure layer MSL (first layer) may comprise inner micro-structure region IMS, outer micro-structure region OMS and core micro-structure region CMS that are simultaneously disposed on the first reflective layer RL1 of the lighting board LCB, as shown in FIGS. 11 and 14A to 14D. The micro-structure layer MSL (second layer) may comprise a plurality of micro-structure regions LMS disposed on the light guide panel LGP. If necessary, the micro-structure layer MSL (third layer) may be disposed on the second reflective layer RL2 of the shielding sheet SS. The significance of the existence of the micro-structure layers MSL (first layer and third layer) located on the lighting board LCB and the shielding sheet SS is that the total reflection ratio of the internal light transmitted laterally in the light guide panel LGP is not as high as expected. As long as an angle between the light and the normal line of the light guide panel LGP is less than a critical angle, a part of the light will be refracted to pass through the light guide panel LGP. Especially, the micro-structure layer MSL (second layer) disposed by the light guide panel LGP corresponding to the keycap KCC (e.g. the micro-structure region LMS in FIG. 3) diffuses light in multiple directions instead of guiding 100% of the light to pass through the light guide panel LGP vertically upwards. Thus, at this time, the micro-structure layer MSL (first layer and third layer) of the lighting board LCB and the shading sheet SS is needed to reflect and recycle the light, such that the scattered light returns to the light guide panel LGP and continues to be transmitted laterally. The diffusion effect of the micro-structure layer MSL (first layer and third layer) helps the light to reach every direction in 360 degrees, thereby improving the luminous uniformity of the corner characters and contour halo of the keycap KCC.

Secondly, low-power illuminant units such as mini LED or micro LED applied to low-stroke keyswitches have a short vertical light emitting distance (1-2 mm), while the target light emitting area (covering the main character/sub-character/keycap boundary halo) is large (about 10-12 mm). If the number and power of the illuminant units are not increased, purely optical manners must be used to prevent light from escaping, to increase the lateral distance of light transmission, or to increase the amount of light transmitted laterally. However, in a small space, how to make 80% of the light emitted upward from the illuminant unit to open the transmission angle so that most of the light enters the light guide panel and transmits laterally is a big problem. Another problem is that if the light passes through multiple reflections and diffusions around the illuminant unit to smoothly transfer the direction/angle of light transmission to the lateral transmission inside the light guide panel (must meet the critical angle of total reflection), the light will be needlessly lost in the early light emitting stage of the illuminant unit. Thus, reducing early loss is another challenge. Accordingly, the backlight module BLM disclosed in the following embodiments of the invention is provided with a protrusion structure DP protruding toward the illuminant unit LED to reduce the early loss of light and open the angle of light transmission, so as to make more light enter the light guide panel LGP to be transmitted laterally.

Please refer to FIGS. 14A, 14B, 14C and 14D along with FIGS. 1 and 3. The lighting keyboard LKB provided by the following embodiments of the invention comprises a plurality of keyswitches KS and a backlight module BLM. The keyswitch KS comprises a keycap KCC, a support mechanism SSR (see FIGS. 4, 6, 8 and 9), a circuit board MEM and a support plate SUP. Furthermore, a restoration member (not shown) may be further disposed between the keycap KCC and the support plate SUP. The support plate SUP has an inner hole Sc and a peripheral hole SUPH corresponding to the keycap KCC. When the support plate SUP is opaque (e.g. made of metal or opaque material), the inner hole Sc and the peripheral hole SUPH allow the light from the backlight module BLM to pass through to illuminate the keyswitch KS.

Referring to FIGS. 14A and 14B along with FIG. 3, the backlight module BLM comprises a shielding sheet SS, a light guide panel LGP, a lighting board LCB and a protrusion structure DP. The shielding sheet SS is disposed between the keyswitch KS (support plate SUP) and the light guide panel LGP. For example, the shielding sheet SS may dispose the aforesaid second reflective layer RL2 on the protection layer PL to reduce and/or block the passage of light in specific areas. At the light emitting position corresponding to the keycap KCC (e.g. the main/sub-character formed by the inner outlet KC0 and the outer outlet KC1), the shielding sheet SS is not provided with the second reflective layer RL2, so as to form the outlet area OA of the backlight module BLM. The outlet area OA is equivalent to the mask layer hole MLH of the mask layer ML of the shielding sheet SS, or the reflective layer hole RLH of the second reflective layer RL2, or the outlet area OA is defined jointly by the mask layer hole MLH and the reflective layer hole RLH. The amount of light output of the halo on four sides of the keycap is controlled by four sides of the outlet area OA. The longer the four sides of the outlet area OA are (or the closer to the edge of the keycap KCC), the greater the amount of light is emitted from the halo. The second reflective layer RL2 may comprise an inner reflective section RL0 (block shape) and an outer reflective section RLF (frame shape). The outlet area OA surrounds the inner reflective section RL0 and the outer reflective section RLF surrounds the outlet area OA, such that the outlet area OA surrounds between the inner reflective section RL0 and the outer reflective section RLF. The outer reflective section RLF corresponds to the inner and outer areas of the keycap KCC, thereby preventing the user from seeing the bright spot (e.g. the micro-structure described later) below the support plate SUP (peripheral hole SUPH) from the gap around the keycap KCC. The inner reflective section RL0 is correspondingly covered above the illuminant unit LED. This is to allow the strongest light to be reflected into the light guide panel LGP to prevent the main character of the keycap KCC from being too bright, which helps to improve the brightness of the characters on the edge or corners, and also helps to improve the luminous uniformity of the keyswitch KS. If necessary, the shielding sheet SS may comprise a mask layer 40 to further shield the light passing through the second reflective layer RL2. The mask layer 40 is formed on the second reflective layer RL2 and corresponds to the position of the illuminant unit LED. The mask layer 40 may be divided into an inner mask layer ML0 (block shape) and an outer mask layer MLF (frame shape).

The light guide panel LGP is located below the shielding sheet SS. The lighting board LCB is disposed below the light guide panel LGP and has an illuminant unit LED. The light guide panel LGP has a light guide hole L0 corresponding to the position of the illuminant unit LED. The illuminant unit LED is disposed in the light guide hole L0. The illuminant unit LED comprises one or more light emitters. The backlight module BLM may further comprise a micro-structure layer MSL. The micro-structure layer MSL may be disposed in parallel to the light guide panel LGP and the lighting board LCB. The micro-structure layer MSL is correspondingly disposed in an area below the main character/sub-character of the keycap KCC, such as formed on the upper or lower surface of the light guide panel LGP (e.g. the micro-structure region LMS in FIG. 3), or formed on the upper surface of the reflective layer of the lighting board LCB, or may be independently formed between the light guide panel LGP and the lighting board LCB (e.g. the inner micro-structure region IMS and the outer micro-structure region OMS in FIG. 3).

The protrusion structure DP may be formed at the shielding sheet SS to be located above the illuminant unit LED and protrude towards the illuminant unit LED (or protrude towards the lighting board LCB). The biggest purpose of setting the protrusion structure DP is to diffuse the light and open or increase the light transmission angle (relative to the normal line of the top surface of the illuminant unit LED), i.e. to allow the light to have a larger lateral transmission component. In this way, more light may be allowed to enter the light guide panel LGP at the early stage of light emission, and transmit laterally through the total reflection in the light guide panel LGP. Generally speaking, the protrusion structure DP of the invention protruding towards the illuminant unit LED/lighting board LCB may be disposed on any component above the illuminant unit LED, such as the shielding sheet SS (FIGS. 3, 11, 14B), the support plate SUP (not shown) or the circuit board MEM (FIGS. 4, 6, 7, 8, 9). The protrusion structure DP may be integrally formed by the shielding sheet SS, the support plate SUP or the circuit board MEM (e.g. punching with a mold), or fixed on the surface of the shielding sheet SS, the support plate SUP or the circuit board MEM as an independent component (e.g. printing or dispensing paint, ink or adhesive to form a protrusion). The height of the protrusion structure DP may be, for example, 18% to 95% of the thickness of the light guide panel LGP.

The protrusion structure DP on the shielding sheet SS may be formed by a protruding portion of the protection layer PL, and the inner reflective section RL0 and the inner mask layer ML0 are located on the upper surface and/or the lower surface of the protruding portion of the protection layer PL. The independent protrusion structure DP is located on the lower surface of the lowermost layer among the protection layer PL, the inner reflective section RL0 and the inner mask layer ML0.

The protrusion structure DP protrudes towards the illuminant unit LED or protrudes towards the lighting board LCB, and this design is against common sense. It will not only increase the thickness of the backlight module BLM at the illuminant unit LED, but also interfere with the illuminant unit LED and affect the lighting effect. When low-power illuminant unit, such as mini LED or micro LED, are used, the height of the illuminant unit LED is greatly reduced than the conventional LED, but the area of the soldering spot is too small to reduce the soldering strength. Furthermore, the backlight module BLM and its shielding sheet SS, light guide panel LGP and lighting board LCB have all experienced the process of thickness thinning. If the thickness of the illuminant unit LED is too large, the soldering spot of the illuminant unit LED may be easily touched by external force and break. The protrusion of the protrusion structure DP toward the illuminant unit LED may cause the thickness of the backlight module BLM at the illuminant unit LED to be too large, such that the top surface or the bottom surface of the backlight module BLM protrudes. The backlight module BLM protrudes downward because the lighting board LCB protrudes downward at the illuminant unit LED (similar to FIG. 6) and it makes the circuit of the lighting board LCB partially bend near the illuminant unit LED, such that the soldering spot of the illuminant unit LED may peel off. Alternatively, the shielding sheet SS may also protrude above the illuminant unit LED (similar to FIG. 7). No matter whether the backlight module BLM protrudes upward or downward at the illuminant unit LED, the illuminant unit LED may also interfere with the protrusion structure DP to damage the phosphor on the surface of the illuminant unit LED, and eventually cause problem of color cast (e.g. white light tends to be bluish or multi-color mixed light has color cast phenomenon). The next problem is that if the protrusion structure DP partially enters the light guide hole L0 of the light guide panel LGP, it will force the relative position of the illuminant unit LED to move downward, which will affect the optical coupling mechanism between the illuminant unit LED and the wall of the light guide hole L0. Another problem is that if the light guide hole L0 of the light guide panel LGP cannot fully accommodate the protrusion structure DP, the peripheral area of the protrusion structure DP may cause unnecessary air gaps, resulting in loss of light without smoothly entering the light guide panel LGP. However, in contrast, solving these problems also means that the protrusion structure DP of the invention protrudes towards the illuminant LED, which may be transformed into an advantageous solution.

In FIG. 14B, the protrusion structure DP is formed by the protection layer PL of the shielding sheet SS protruding downward, or formed by a transparent or non-transparent protrusion at the same position, wherein the protruding direction faces the illuminant unit LED or faces the lighting board LCB. The inner reflective section RL0 and the inner mask layer ML0 of the shielding sheet SS may overlap to be formed on the upper surface or the lower surface of the protrusion structure DP (the upper and lower surfaces of the protection layer PL there). Furthermore, the stacking order of the second reflective layer RL2, the mask layer ML and the protection layer PL of the shielding sheet SS is not limited, and the size ratio, the ink color and the material type of the second reflective layer RL2 and the mask layer ML vary according to the practical light emission of the backlight module BLM. For example, the second reflective layer RL2 (inner reflective section RL0) may be formed on the lower surface S2 of the protection layer PL at the protrusion structure DP, and the mask layer 40 (inner mask layer ML0) may be formed between the second reflective layer RL2 (inner reflective section RL0) and the lower surface of the protection layer PL. Alternatively, the second reflective layer RL2 (inner reflective section RL0) may be formed on the lower surface of the protection layer PL at the protrusion structure DP, and the mask layer 40 (inner mask layer ML0) may be formed on the upper surface of the protection layer PL at the protrusion structure DP. The diffusion effect of the protrusion structure DP may come from the second reflective layer RL2 (inner reflective section RL0) or from the protrusion structure DP itself. The protruding smooth or rough curved surface of the protrusion structure DP or the protrusion structure DP made of reflective material both allow the protrusion structure DP to provide the effect of diffusing light without the second reflective layer RL2 (inner reflective section RL0). The protrusion structure DP may have one or more convex points, or form a plurality of concave-convex areas, which is disposed in the light emitting range of the illuminant unit LED at a close distance, such as an elliptical hemisphere with 360 degrees horizontally and 120 degrees vertically.

Regarding the interference between the protrusion structure DP and the illuminant unit LED, several solutions may be used to reduce the negative impact. For example, thinning the thickness of the shielding sheet SS or improving the elasticity and smoothness of the shielding sheet SS and the inner reflective section RL0 thereof both may reduce the negative impact of the protrusion structure DP on the illuminant unit LED during interference. Furthermore, controlling the arc surface curvature of the mold may increase the arc surface curvature of the protrusion structure DP, reduce the depth of the protrusion structure DP entering the light guide hole L0 of the light guide panel LGP, and then generate a safe distance between the protrusion structure DP and the illuminant unit LED. Another manner is to dispense glue (e.g. UV light-curable glue) on the surface of the illuminant unit LED, which may also add a layer of protective glue on the phosphor of the illuminant unit LED, so as to generate a safe distance between the protrusion structure DP and the illuminant unit LED. Alternatively, let the lowest point of the protrusion structure DP be elevated through design or mold processing, or even make a part of the periphery surrounding the protrusion structure DP slightly protrude upward, such that a safe distance may be generated between the protrusion structure DP and the illuminant unit LED, and at the same time, the overall thickness at the position of the illuminant unit LED may be well controlled. Alternatively, the protrusion structure DP does not face the illuminant unit LED, but at least partially surrounds the illuminant unit LED, so as to reduce the interference between the protrusion structure DP and the illuminant unit LED.

In addition, the invention may further adopt the design of adhesive layer. For example, as shown in FIGS. 14A and 14B, the backlight module BLM may further comprise at least one adhesive layer Ah. FIGS. 14A and 14B show an adhesive layer Ah attached between the shielding sheet SS and the light guide panel LGP. The adhesive layer Ah at least partially surrounds the protrusion structure DP, the light guide hole L0 and the illuminant unit LED. FIGS. 14A and 14B further show another adhesive layer Ah attached between the light guide panel LGP and the first reflective layer RL1. The adhesive layer Ah also at least partially surrounds the protrusion structure DP, the light guide hole L0 and the illuminant unit LED. The aforesaid adhesive layer Ah is parallel to the shielding sheet SS, parallel to the light guide panel LGP, and also parallel to the lighting board LCB. A non-adhesive area CA may preferably be provided between the adhesive layer Ah and the light guide hole L0 of the light guide panel LGP. In the top view, the non-adhesive area CA at least partially surrounds the protrusion structure DP, so as to prevent the adhesive layer Ah from entering the light guide hole L0 of the light guide panel LGP and sticking to the illuminant unit LED during the process, thereby resulting in excessive light output or the illuminant unit LED falling off. The non-adhesive area CA may be disposed on the upper surface of the light guide panel LGP (or between the light guide panel LGP and the shielding sheet SS), and the non-adhesive area CA may also be disposed on the lower surface of the light guide panel LGP (or between the light guide panel LGP and the lighting board LCB). The adhesive layer Ah has good effect of light coupling. Through the aforesaid design of the adhesive layer Ah, the light of the illuminant unit LED may smoothly reach the medium on the other side of the adhesive layer Ah when the light is directly or indirectly incident on the adhesive layer Ah, such that the light may be reflected back to the light guide panel LGP between the second reflective layer RL2 and the first reflective layer RL1 after exiting the light guide panel LGP. Accordingly, it can avoid light leakage and loss in the air gap between the light guide panel LGP and the shielding sheet SS or in another air gap between the light guide panel LGP and the first reflective layer RL1 of the lighting board LCB, so as to ensure that sufficient light ratio may continue to be laterally transmitted in the light guide panel LGP to a far position. Through the aforesaid arrangement, the protrusion structure DP may diffuse light to open or increase the light transmission angle (relative to the normal line of the top surface of the illuminant unit LED), increase the lateral transmission component of light, and allow more light to enter the light guide panel LGP in the early stage of light emission. Then, through the light coupling effect of the adhesive layer Ah surrounding the protrusion structure DP, the early leakage of light may be guided back into the light guide panel LGP. Furthermore, the light escaping from the upper and lower surfaces of the light guide panel LGP may be reflected and recycled to the light guide panel LGP through the first reflective layer RL1 and the second reflective layer RL2, so as to ensure that more light reaches the sides and corners of the keycap KCC. At this time, the light may be diffused upward through the micro-structure layer MSL (as shown in FIGS. 3, 11, 14A and 14B), thereby allowing the light to pass through the light guide panel LGP upward. In this way, the light may continue to pass through the outlet area OA of the shielding sheet SS, the inner hole Sc and the peripheral hole SUPH of the support plate SUP, and the circuit board MEM to emit light from the keycap KCC, so as to generate the character luminescence and surrounding halo effects of the keycap KCC and achieve a considerable degree of uniformity. In the following, the protrusion structure DP is further integrated into the aforesaid embodiments of the invention to obtain several optimized designs.

In FIG. 14D, the illuminant unit LED has a plurality of color dies arranged in straight lines along the short side, or each long side of the three color dies is parallel to the long side of the illuminant unit LED, that is, each long side of the three color dies is arranged along the Y direction. Even if the arrangement in FIG. 14D is not adopted, the design of the protrusion structure DP protruding towards the illuminant unit LED and the lighting board LCB may still help to diffuse different colors of light, and assist the three color dies of the illuminant unit LED to fully mix light in a very short distance, so as to reduce the color cast problem.

Referring to FIGS. 3, 14A and 14B, the first preferred design of the backlight module BLM of the invention is to combine the protrusion structure DP and the footprint FP to generate an optical effect of uniform light emission. The backlight module BLM at least comprises a shielding sheet SS, a lighting board LCB and a protrusion structure DP. The lighting board LCB comprises an illuminant unit LED and a pair of footprints FP respectively connecting the illuminant unit LED. Each of the footprints comprises one or more hollow areas Ha/Hb. The hollow areas Ha/Hb at least partially overlap with the illuminant unit LED. The protrusion structure DP is formed at the shielding sheet SS and protrudes towards the lighting board LCB. The protrusion structure DP at least partially overlaps with the pair of footprints FP, so as to diffuse partial light of the illuminant unit LED between the protrusion structure DP and the pair of footprints FP. The significance of overlapping the footprint FP is that the protrusion structure DP is directly above the illuminant unit LED. For nearly 80% of the illuminant units LED such as mini LED or Micro LED that emits light upward, it is possible to reflect and diffuse the light emitted by the illuminant unit LED in the early stage to the greatest extent. Secondly, the footprint FP is partially exposed outside the illuminant unit LED, which allows the metal surface of the exposed section of the footprint FP to reflect the light diffused from the protrusion structure DP to enter the light guide panel LGP for lateral transmission. Alternatively, the footprint FP may be partially covered by the inner ring section RL1*i* of the first reflective layer RL1 of the lighting board LCB, and the protrusion structure DP also overlaps with the inner ring section RL1*i* while overlapping with the footprint FP, such that the inner ring section RL1*i* may also reflect light diffused from the protrusion structure DP. Thus, the partial light of the illuminant unit LED may be diffused between the protrusion structure DP and the pair of footprints FP to enter the light guide panel LGP for lateral transmission.

Referring to FIGS. 3, 11, 14A and 14B, the second preferred design of the backlight module BLM of the invention is to combine the protrusion structure DP and the micro-structure region MS of the lighting board LCB to generate an optical effect of uniform light emission. The backlight module BLM at least comprises a shielding sheet SS, a light guide panel LGP, a lighting board LCB and a protrusion structure DP. The lighting board LCB comprises two non-intersecting traces (e.g. main traces HT and LT, or sub-traces STa and STb), a plurality of micro-structure regions (e.g. inner micro-structure region IMS, outer micro-structure region OMS or core micro-structure region CMS) and at least one illuminant unit LED. The illuminant unit LED is connected between the two non-intersecting traces (HT and LT, or STa and STb). The plurality of micro-structure regions (e.g. inner micro-structure region IMS, outer micro-structure region OMS or core micro-structure region CMS) do not overlap with the two non-intersecting traces (HT and LT, or STa and STb). The light guide panel LGP is disposed on the lighting board LCB. The shielding sheet SS is disposed on the light guide panel LGP. The protrusion structure DP is formed at the shielding sheet SS and protrudes towards the lighting board LCB. The protrusion structure DP is located between the plurality of micro-structure regions (e.g. inner micro-structure region IMS, outer micro-structure region OMS or core micro-structure region CMS), so as to diffuse the partial light of the illuminant unit LED to enter the light guide panel LGP for lateral transmission. The significance of the protruding structure DP located between the micro-structure regions MS of the lighting board LCB is to combine the effect of the protruding structure DP to diffuse light in the early stage of the optical path into the light guide panel LGP for lateral transmission with the effect of the core micro-structure region CMS, the inner micro-structure region IMS or the outer micro-structure region OMS to reflect and recycle the light in the subsequent optical path back to the light guide panel LGP for further transmission, so as to achieve uniform brightness of single keyswitch and multiple keyswitches of the aforesaid keyswitches KS of each embodiment of the invention.

Referring to FIGS. 3, 11, 14A and 14B, the third preferred design of the backlight module BLM of the invention is to combine the protrusion structure DP and the micro-structure region MS of the lighting board LCB to generate an optical effect of uniform light emission. The backlight module BLM comprises a first uniform light area Z1 surrounding the illuminant unit LED to make light of the illuminant unit LED uniform. The first uniform light area Z1 comprises a protrusion structure DP, a pair of footprints FP and a first reflective layer RL1. The protrusion structure DP is formed at the shielding sheet SS and protrudes towards the lighting board LCB. The protrusion structure DP is able to diffuse the light of the illuminant unit LED. The pair of footprints FP are located on the lighting board LCB and configured to connect the illuminant unit LED. The first reflective layer RL1 is disposed on the lighting board LCB and comprises an inner ring section RL1*i* at least partially covering the pair of footprints FP, and the inner ring section RL1*i* of the first reflective layer RL1 reflects light from the illuminant unit LED and/or the protrusion structure DP. This means that the first reflective layer RL1 also surrounds the illuminant unit LED, especially the ring-shaped area of the first reflective layer RL1 within the range of the light guide hole L0 of the light guide panel LGP. Furthermore, in the top view, the first reflective layer RL1 also surrounds the protruding structure DP and the pair of footprints FP at the same time. Since the part of the pair of footprints FP covered by the inner ring section RL1*i* of the first reflective layer RL1 may form the core micro-structure region CMS with better effects of reflection and diffusion, the light directly from the illuminant unit LED (e.g. side light emission) or the light diffused indirectly by the protruding structure DP may be continuously reflected and diffused by the inner ring section RL1*i* of the first reflective layer RL1, so as to enter the light guide panel LGP for lateral transmission. Still further, the backlight module BLM may further comprise a second uniform light area Z2 surrounding the first uniform light area Z1. The second uniform light area Z2 comprises a pair of micro-structure regions IMS apart from each other and located on the first reflective layer RL1. The pair of micro-structure regions IMS are located at opposite sides of the protrusion structure DP (and the pair of footprints FP) in the top view.

Referring to FIG. 11, a preferred design of the lighting keyboard LKB of the invention is to use a plurality of protrusion structures DP to generate an optical effect of uniform light between a plurality of keyswitches KS. The keycaps KCC of two adjacent keyswitches KS2 and KS3 are arranged in the same row, and the backlight module BLM is located below the two adjacent keycaps KCC. The shielding sheet SS comprises at least two outlet areas OA respectively corresponding to the two adjacent keycaps KCC of the keyswitches KS2 and KS3. The lighting board LCB comprises at least two illuminant units respectively corresponding to the at least two outlet areas OA of the shielding sheet SS with respect to the keyswitches KS2 and KS3. At least two protrusion structures DP are respectively formed at the at least two outlet areas OA of the shielding sheet SS and respectively protrude towards the lighting board LCB. The at least two protruding structures DP respectively diffuse the partial light of the aforesaid at least two illuminant units LED to respectively enter the light guide panel LGP for lateral transmission and then pass through the aforesaid at least two outlet areas OA of the shielding sheet SS to illuminate the aforesaid at least two adjacent keycaps KCC of the keyswitches KS2 and KS3. In the top view, the lighting board LCB has a micro-structure region MS (consisting of two adjacent inner micro-structure regions IMS) located between the aforesaid at least two protrusion structures DP. The micro-structure region MS crosses the gap Gx in the X direction between the at least two adjacent keycaps KCC of the keyswitches KS2 and KS3. The significance of this design is that the adjacent keyswitches KS2 and KS3 use the exclusive protrusion structure DP to diffuse the light respectively, such that the two adjacent keycaps KCC may achieve uniformity of light within the range of a single key. In the case of adopting uniform specification/quantity of the illuminant units LED and the size of the keycaps KCC, two adjacent keycaps KCC may achieve uniformity of luminous.

Referring to FIG. 11, another preferred design of the lighting keyboard LKB of the invention is to use a plurality of protrusion structures DP and micro-structure regions MS to generate an optical effect of uniform light between a plurality of keyswitches KS and reduction of light leakage. Among three adjacent keyswitches, the keycaps KCC of two keyswitches KS2 and KS3 are arranged in the same row, the keycap KCC of the keyswitch KS1 is arranged in another adjacent row in the Y direction, and the backlight module BLM is located below three adjacent keycaps KCC. The shielding sheet SS comprises at least three outlet areas OA respectively corresponding to the three adjacent keycaps KCC of the keyswitches KS1, KS2 and KS3. The lighting board LCB comprises at least three illuminant units LED respectively corresponding to the three adjacent keycaps KCC of the keyswitches KS1, KS2 and KS3. At least three protrusion structures DP are respectively formed at the shielding sheet SS and respectively protrude towards the lighting board LCB. The at least three protruding structures DP respectively diffuse the partial light of the aforesaid at least three illuminant units LED to respectively enter the light guide panel LGP for lateral transmission and then pass through the aforesaid at least three outlet areas OA of the shielding sheet SS to illuminate the aforesaid at least three adjacent keycaps KCC of the keyswitches KS1, KS2 and KS3. The backlight module BLM has a board hole BH and at least one micro-structure region MS (e.g. three outer micro-structure regions OMS) surrounding the board hole BH. The board hole BH penetrates the shielding sheet SS, the light guide panel LGP and the lighting board LCB. The at least one micro-structure region MS is located between the board hole BH and the at least three protrusion structures DP in the top view, which means that the at least three protrusion structures DP greatly increase the light component of lateral transmission, and also highlight the problem of light leakage from the board hole BH. Since the three outer micro-structure regions OMS are not only distributed in the vertical projection range of the aforesaid at least three adjacent keycaps KCC of the keyswitches KS1, KS2 and KS3, they are also distributed all the way to the gaps Gx and Gy in the X and Y directions to surround the board hole BH. It is equivalent to three outer micro-structure regions OMS forming a merged micro-structure region MS overlapping with the gaps Gx and Gy between the three keycaps KCC, such that the merged micro-structure region MS also surrounds the board hole BH located between the gap Gx and/or the gap Gy. Thus, when the light path travels beyond the outlet area OA, the excess light may be reflected, diffused, and lost in advance through the aforesaid at least one micro-structure region MS (three outer micro-structure regions OMS), so as to reduce the light component reaching the board hole BH and reduce light leakage from the board hole BH. The aforesaid micro-structure region MS is not limited to the three outer micro-structure regions OMS located on the first reflective layer RL1 of the lighting board LCB. As mentioned in the above, the micro-structure region LMS may be disposed on the light guide panel LGP in FIG. 3, and even the micro-structure region MS may be disposed on the second reflective layer RL2 of the shielding sheet SS. The three layers of micro-structure regions MS may be used independently or in combination to reduce the light component reaching the board hole BH in areas beyond the outlet area OA. Another manner that may be used is the optical coupling effect of the adhesive layer Ah. The adhesive layer Ah surrounds the board hole BH and the aforesaid merged micro-structure region MS is also located between the adhesive layer Ah and the three protrusion structures DP. The adhesive layer Ah may lose light in advance. If necessary, the non-adhesive layer CA may also be disposed around the board hole BH, and the adhesive layer CA may surround the non-adhesive layer CA, so as to prevent the adhesive layer Ah from being too close to the board hole BH and causing light leakage. In this way, the aforesaid at least one micro-structure region MS is located between the adhesive layer Ah and at least three protrusion structures DP, wherein the three of them respectively provide diffused uniform light, light guide and output, and diffusion loss at different stages of the optical path, thereby reducing light leakage from the board hole BH.

As mentioned in the above, in the invention, the protrusion structure and the illuminant unit overlap with each other, and the light of the illuminant unit may be reflected and diffused in the early stage of the optical path by means of the protrusion structure protruding to the illuminant unit or to the lighting board, so as to open the light transmission angle, improve the lateral transmission component, and increase the amount of light incident on the light guide panel LGP. In this way, in addition to avoiding the excessive brightness of the middle character, it also improves the brightness of the side or corner character or improves the light mixing effect of the multi-color dies of the illuminant unit, thereby greatly improving the uniformity of light emission of the backlight keyswitch and the visual aesthetics in use. Before the light exceeds the outlet area of the shielding sheet and reaches the board hole at the end of the light path, the protrusion structure may also be used in combination with the micro-structure region and the adhesive layer to achieve the effect of reducing light leakage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module configured to illuminate at least one keycap, the backlight module comprising:

a shielding sheet;

a lighting board comprising an illuminant unit and a pair of footprints respectively connecting the illuminant unit, each of the footprints comprising at least one hollow area, the at least one hollow area overlapping with at least a portion of the illuminant unit; and a protrusion structure formed at the shielding sheet, the protrusion structure protruding towards the lighting board and at least partially overlapping with the pair of footprints;

wherein each of the footprints comprises a plurality of branches defining the at least one hollow area, and at least one of the plurality of branches of the pair of footprints comprises an exposed section capable of reflecting light.

2. The backlight module of claim 1, wherein the lighting board further comprises a first reflective layer surrounding the illuminant unit and at least partially covering the at least one hollow area.

3. The backlight module of claim 1, wherein the lighting board further comprises a pair of micro-structure regions apart from each other and located at opposite sides of the protrusion structure.

4. The backlight module of claim 1, wherein the plurality of branches of the pair of footprints form a pair of flat sides parallel to each other, and a short side of the illuminant unit is smaller than a width of the pair of flat sides.

5. The backlight module of claim 1, further comprising a light guide panel having a light guide hole for accommodating the illuminant unit, the lighting board comprising a first reflective layer at least partially located in the light guide hole.

6. The backlight module of claim 5, wherein the first reflective layer has a reflective layer hole, and a part of the first reflective layer overlapping with the pair of footprints is at least partially located between the reflective layer hole and the light guide hole.

7. The backlight module of claim 1, wherein the lighting board comprises a first reflective layer, and the shielding sheet comprises an inner reflective area overlapping with the protrusion structure and the first reflective layer.

8. The backlight module of claim 1, further comprising an adhesive layer at least partially surrounding the protrusion structure in a vertical direction.

9. The backlight module of claim 1, wherein the illuminant unit comprises at least three dies providing at least three color lights, and the at least three dies are arranged consecutively with short side to short side.

10. The backlight module of claim 1, wherein the lighting board comprises two main traces apart from each other and electrically connected to the pair of footprints, and the protrusion structure is located between the two main traces.

11. The backlight module of claim 10, wherein the lighting board further comprises a pair of inner micro-structure regions apart from each other and located between the two main traces.

12. The backlight module of claim 10, wherein the lighting board further comprises a pair of outer micro-structure regions apart from each other and located beyond the two main traces.

13. The backlight module of claim 1, wherein the lighting board comprises two sub-traces electrically connected to the pair of footprints, and the lighting board further comprises a pair of inner micro-structure regions apart from each other and located at opposite sides of the two sub-traces.

14. A lighting keyboard comprising:

a plurality of keycaps; and the backlight module of claim 1 disposed below the plurality of keycaps, the backlight providing light to illuminate the plurality of keycaps.

15. A backlight module configured to illuminate at least one keycap, the backlight module comprising a shielding sheet, an illuminant unit and a lighting board, the backlight module further comprising a first uniform light area surrounding the illuminant unit to make light of the illuminant unit uniform, the first uniform light area comprising:

a protrusion structure formed at the shielding sheet and protruding towards the lighting board, the protrusion structure diffusing the light of the illuminant unit;

a pair of footprints located on the lighting board and configured to connect the illuminant unit; and a first reflective layer located on the lighting board and comprising an inner ring section at least partially covering the pair of footprints, the inner ring section of the first reflective layer reflecting light from the illuminant unit and/or the protrusion structure;

wherein the backlight module further comprises a second uniform light area surrounding the first uniform light area, the second uniform light area comprises a pair of micro-structure regions apart from each other and located on the first reflective layer, and the pair of micro-structure regions is located at opposite sides of the protrusion structure.

16. The backlight module of claim 15, further comprising a light guide panel located between the shielding sheet and the lighting board, the protrusion structure diffusing the light of the illuminant unit to be transmitted laterally in the light guide panel.

17. The backlight module of claim 15, further comprising a light guide panel having a light guide hole for accommodating the illuminant unit, the first reflective layer being at least partially located in the light guide hole.

* * * * *